United States Patent
Raj et al.

(10) Patent No.: US 9,830,096 B2
(45) Date of Patent: *Nov. 28, 2017

(54) MAINTAINING DATA BLOCK MAPS OF CLONES OF STORAGE OBJECTS

(71) Applicant: NetApp Inc., Sunnyvale, CA (US)

(72) Inventors: Bipul Raj, Bangalore (IN); Alok Sharma, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/952,947

(22) Filed: Nov. 26, 2015

(65) Prior Publication Data

US 2016/0077756 A1 Mar. 17, 2016

Related U.S. Application Data

(63) Continuation of application No. 14/457,332, filed on Aug. 12, 2014, now Pat. No. 9,207,875, which is a (Continued)

(51) Int. Cl.
*G06F 13/00* (2006.01)
*G06F 3/06* (2006.01)
(Continued)

(52) U.S. Cl.
CPC .......... *G06F 3/0619* (2013.01); *G06F 3/0604* (2013.01); *G06F 3/065* (2013.01);
(Continued)

(58) Field of Classification Search
CPC ...... G06F 3/0619; G06F 3/0604; G06F 3/065; G06F 3/0608; G06F 3/067; G06F 3/0641;
(Continued)

(56) References Cited

U.S. PATENT DOCUMENTS 7,757,056 B1 * 7/2010 Fair ........................ G06F 3/0605
711/162
7,996,636 B1 8/2011 Prakash et al.
(Continued)

FOREIGN PATENT DOCUMENTS

CN 101495970 A 7/2009
KR 1020090059859 A 11/2009

OTHER PUBLICATIONS

International Preliminary Report on Patentability for Application No. PCT/US2012/035302 dated Mar. 4, 2014, 5 pages.
(Continued)

*Primary Examiner* — Hong Kim
(74) *Attorney, Agent, or Firm* — Cooper Legal Group, LLC

(57) ABSTRACT

Described herein is a system and method for retaining deduplication of data blocks of a resulting storage object (e.g., a flexible volume) from a split operation of a clone of a base storage object. The clone may comprise data blocks that are shared with at least one data block of the base storage object and at least one data block that is not shared with at least one data block of the base storage object. The data blocks of the clone that are shared with the base storage object may be indicated to receive a write allocation that may comprise assigning a new pointer to an indicated data block. Each data block may comprise a plurality of pointers comprising a virtual address pointer and a physical address pointer. As such, data blocks of the clone comprising the same virtual address pointer may be assigned a single physical address pointer. Thus, a new physical address pointer is assigned or allocated once to a given virtual address pointer of data blocks of a clone.

20 Claims, 13 Drawing Sheets

Related U.S. Application Data continuation of application No. 13/221,442, filed on Aug. 30, 2011, now Pat. No. 8,832,035.

(51) Int. Cl.
    *G06F 17/30* (2006.01)
    *G06F 9/46* (2006.01)
    *G06F 12/02* (2006.01)

(52) U.S. Cl.
    CPC ............ *G06F 3/067* (2013.01); *G06F 3/0608* (2013.01); *G06F 3/0641* (2013.01); *G06F 9/465* (2013.01); *G06F 12/02* (2013.01); *G06F 17/30371* (2013.01); *G06F 17/30607* (2013.01); *G06F 2003/0697* (2013.01)

(58) Field of Classification Search
    CPC .... G06F 12/02; G06F 17/30371; G06F 9/465; G06F 17/30607; G06F 2003/0697
    USPC ........ 707/664, 662, 663; 711/132, 147, 170; 714/6.1
    See application file for complete search history.

(56) References Cited

U.S. PATENT DOCUMENTS

| | | | |
|---|---|---|---|
| 8,423,733 B1* | 4/2013 | Ozdemir | G06F 3/0604 711/162 |
| 8,443,153 B1 | 5/2013 | Edwards et al. | |
| 8,832,035 B2* | 9/2014 | Raj | G06F 3/0608 707/662 |
| 9,207,875 B2* | 12/2015 | Raj | G06F 3/0608 |
| 2003/0195903 A1 | 10/2003 | Manley et al. | |
| 2005/0246397 A1 | 11/2005 | Edwards et al. | |
| 2007/0156957 A1 | 7/2007 | MacHardy et al. | |
| 2007/0276878 A1 | 11/2007 | Zheng et al. | |
| 2008/0005141 A1 | 1/2008 | Zheng et al. | |
| 2008/0082589 A1 | 4/2008 | English et al. | |
| 2009/0271589 A1 | 10/2009 | Karpoff et al. | |
| 2010/0011037 A1 | 1/2010 | Kazar | |
| 2010/0198795 A1 | 8/2010 | Chen et al. | |
| 2012/0130949 A1 | 5/2012 | Picken et al. | |
| 2012/0278553 A1 | 11/2012 | Mudhiganti et al. | |
| 2013/0054927 A1* | 2/2013 | Raj | G06F 3/0608 711/170 |
| 2013/0311735 A1* | 11/2013 | Sivakumar | G06F 3/0611 711/162 |
| 2014/0351539 A1* | 11/2014 | Raj | G06F 3/0608 711/162 |

OTHER PUBLICATIONS

International Search Report and Written Opinion for Application No. PCT/US2012/035302 dated Nov. 28, 2012, 9 pages.

Supplementary European Search Report for Application No. EP12828124 dated May 21, 2015, 8 pages.

Notice of Allowance cited in U.S. Appl. No. 13/221,442 dated May 7, 2014, 8 pgs.

Non-Final Office Action cited in U.S. Appl. No. 14/457,332 dated Aug. 27, 2014, 6 pgs.

Reply Non-Final Office Action cited in U.S. Appl. No. 14/457,332 dated Jan. 27, 2015, 9 pgs.

Final Office Action cited in U.S. Appl. No. 14/457,332 dated Apr. 6, 2015, 23 pgs.

Response after Final Office Action cited in U.S. Appl. No. 14/457,332 dated Jun. 26, 2015, 11 pgs.

Advisory Action cited in U.S. Appl. No. 14/457,332 dated Jul. 9, 2015, 3 pgs.

Notice of Allowance cited in U.S. Appl. No. 14/457,332 dated Aug. 26, 2015, 14 pgs.

Amendment after Notice of Allowance cited in U.S. Appl. No. 14/457,332 dated Oct. 30, 2015, 11 pgs.

\* cited by examiner

MAINTAINING DATA BLOCK MAPS OF CLONES OF STORAGE OBJECTS

RELATED APPLICATIONS

This application claims priority to and is a continuation of U.S. application Ser. No. 14/457,332, filed on Aug. 12, 2014, presently titled "SYSTEM AND METHOD FOR RETAINING DEDUPLICATION IN A STORAGE OBJECT AFTER A CLONE SPLIT OPERATION" and U.S. application Ser. No. 13/221,442, filed on Aug. 30, 2011, presently titled "SYSTEM AND METHOD FOR RETAINING DEDUPLICATION IN A STORAGE OBJECT AFTER A CLONE SPLIT OPERATION", which are incorporated herein.

FIELD

Embodiments of the instant disclosure relate to storage systems, and in particular, for retaining deduplication in a storage object after a clone split operation.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files and logical units, served by the cluster in response to multi-protocol data access requests issued by servers.

Each storage system(node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each storage system of the cluster may comprise a storage operating system. Moreover, each server may execute numerous applications requiring the data services of the cluster. The data of each server may be stored in storage objects on the shared storage, such as data aggregates, volumes, clones of volumes, etc. As such, the storage system may comprise a storage operating system that performs system operations on storage objects. For example, the storage operating system may perform a deduplication operation on a volume, produce a clone of the volume, and perform a split operation on the clone of the volume.

As known in the art, to conserve storage space on the volume, data of a volume may be deduplicated. A clone for the volume may then be produced whereby the clone may be based or dependent upon a base volume so that the clone of the flexible volume comprises data blocks that are shared with the base volume. The clone of the flexible volume may also comprise deduplicated data blocks. A split operation on the clone of the volume may then be performed to make the clone independent of its base volume so that the resulting volume does not comprise data blocks shared with the base flexible volume. Typically, however, a split of a clone of a volume from its base volume results in the loss of deduplication in the resulting volume, whereby data blocks in the resulting volume no longer comprise deduplicated data blocks. As such, conventional storage system techniques of a split of a clone of a volume from its base volume do not preserve deduplication in data blocks of the resulting volume.

SUMMARY

The embodiments described herein provide a system and method for retaining deduplication in a resulting storage object after a storage object clone split operation. In these embodiments, an original storage object may be deduplicated and then a clone produced for the deduplicated original storage object. The clone may be dependent upon a "base storage object" comprising the data of the original storage object at the point in time the clone is produced. A split operation on the clone may then be performed to produce a resulting storage object that is independent of its base storage object. In some embodiments, during the split operation of the clone, deduplication is retained in the resulting storage object, thereby retaining the storage saving benefits of deduplication.

In some embodiments, a storage system may store a plurality of storage objects on a plurality of storage devices and perform operations on the storage objects. As known in the art, each storage object may comprise underlying data blocks and pointer data blocks. The underlying data blocks may comprise client data that is stored to address locations on storage devices. The pointer data blocks of the storage object may comprise pointers to the underlying data blocks. The storage system may perform deduplication on an original storage object whereby an instance of client data (in an underlying data block) is stored only once in a storage aggregate and multiple pointer data blocks of the original storage object may point to the same single instance of the client data, thus providing storage saving benefits.

The storage system may then produce a clone of the deduplicated original storage object, the clone being dependent on a "base storage object" (comprising the data of the original storage object at the point in time the clone is produced) and a "delta data" (comprising data changes to the original storage object after the point in time the clone is produced). If the original storage object was deduplicated, the base storage object may also be deduplicated and have the storage benefits of deduplication (since the base storage object comprises a copy of the original storage object at the point in time the clone is produced).

The base storage object may also comprise underlying data blocks and pointer data blocks. The underlying data blocks may comprise client data that is stored to address locations on storage devices. The pointer data blocks of the base storage object may comprise pointers to the underlying data blocks of the base storage object. The clone may comprise separate copies of the pointer data blocks of the base storage object, but will typically not have separate copies of the underlying data blocks of the base storage object. Rather, since the clone comprises the same pointer data blocks as the base storage object, the clone comprises the same pointers to the same underlying data blocks of the base storage object. As such, the clone "shares" the underlying data blocks of the base storage object (referred to as "shared data blocks") as the clone does not contain separate copies of the underlying data blocks stored to separate/new address locations. Thus the clone may be considered dependent on the base storage object.

A split operation may then be performed on the clone to make the clone independent of its base storage object. The split operation may produce and store separate copies of the shared data blocks for the clone. For example, split operation logic may submit write allocations for the shared data blocks of the base storage object to copy and store the shared data blocks to separate/new address locations on a storage device for the clone. As such, the underlying data blocks of the base storage object will no longer be shared with the clone as the clone will have its separate copies of the underlying data blocks stored at separate/new address locations. Thus, a split operation may modify a clone to produce a "resulting storage object" that contains separate copies of underlying data blocks and is independent of the base storage object. Typically, however, the resulting storage object will not retain any prior deduplication of the original or base storage objects.

In some embodiments, if the base storage object comprises deduplicated data blocks and if a clone that is dependent on the base storage object is split from the base storage object, the resulting storage object that is produced by the clone split operation may retain deduplication of the base storage object. In these embodiments, when a split operation is performed on a clone, write allocation logic may ensure that, when two or more pointer data blocks of the clone are found that comprise the same pointers to a same underlying data block of the base storage object, a single copy of the underlying data block is produced and stored to a new address location (rather than multiple copies of the underlying data block stored to multiple new address locations). Also, the two or more pointer data blocks in the resulting storage object will be configured so that each pointer to the single copy of the underlying data block is stored to the new address location. As such, in the resulting storage object, an instance of data will be stored once in a storage aggregate and multiple pointer data blocks of the resulting storage object may point to the single instance of the data, thus providing deduplication storage saving benefits.

In some embodiments, pointer data blocks of the clone undergoing a split operation may be indicated to receive a write allocation. For example, pointer data blocks of the clone that are shared with the base storage object may be indicated to receive a write allocation. Each pointer data block of the clone may comprise two pointers: a virtual address pointer and a physical address pointer. The virtual address pointer may point to a location in a virtual address space of the clone and the physical address pointer may point to a location within the storage aggregate (e.g., an underlying data block). A new pointer may be assigned to the physical address pointer of an indicated pointer data block of the clone if the pointer data block of the clone is shared with the base storage object and if a write allocation of another pointer data block of the clone comprising the same virtual address pointer has not been received. If a new pointer is assigned to the physical address pointer of a pointer data block of the clone, then the change to the physical address pointer is recorded. For example, each clone may comprise a block map that describes a relationship between the clone's physical address pointers and the clone's virtual address pointers. The block map may comprise one-to-one pairings of a virtual address pointer to a physical address pointer. As such, each virtual address pointer of the clone corresponds to one physical address pointer of the clone. In a subsequent write allocation of a pointer data block of the clone, the block map of the clone may then be checked to determine if a new pointer has been assigned to a physical address pointer paired with a virtual address pointer that corresponds to the virtual address pointer of the subsequent pointer data block of the clone. As such, if it has been determined that if a write allocation of a pointer data block of the clone comprising the same virtual address pointer has been received, then the write allocation will assign to the pointer data block of the clone the physical address pointer from the block map that is paired with the virtual address pointer of the pointer data block of the clone that has been indicated for a write allocation. As such, if multiple indicated pointer data blocks of the clone have an identical virtual address pointer, only one new physical address pointer may be assigned to all of the indicated pointer data blocks of the clone that comprise the identical virtual address pointer.

As such, the clone split and deduplication retention system and method presents several advantages for a storage system environment. For example, splitting a clone from its base storage object may be more efficient when the base storage object comprises shared data blocks due to deduplication. The clone split and deduplication retention system and method may result in a faster clone split operation and the retention of deduplicated data blocks in the resulting storage object. As such, since deduplication is retained in the resulting storage object, the storage system may utilize less storage resources and an administrator of the storage system may not need to re-run a deduplication process on the resulting storage object.

DETAILED DESCRIPTION

Figure 1:
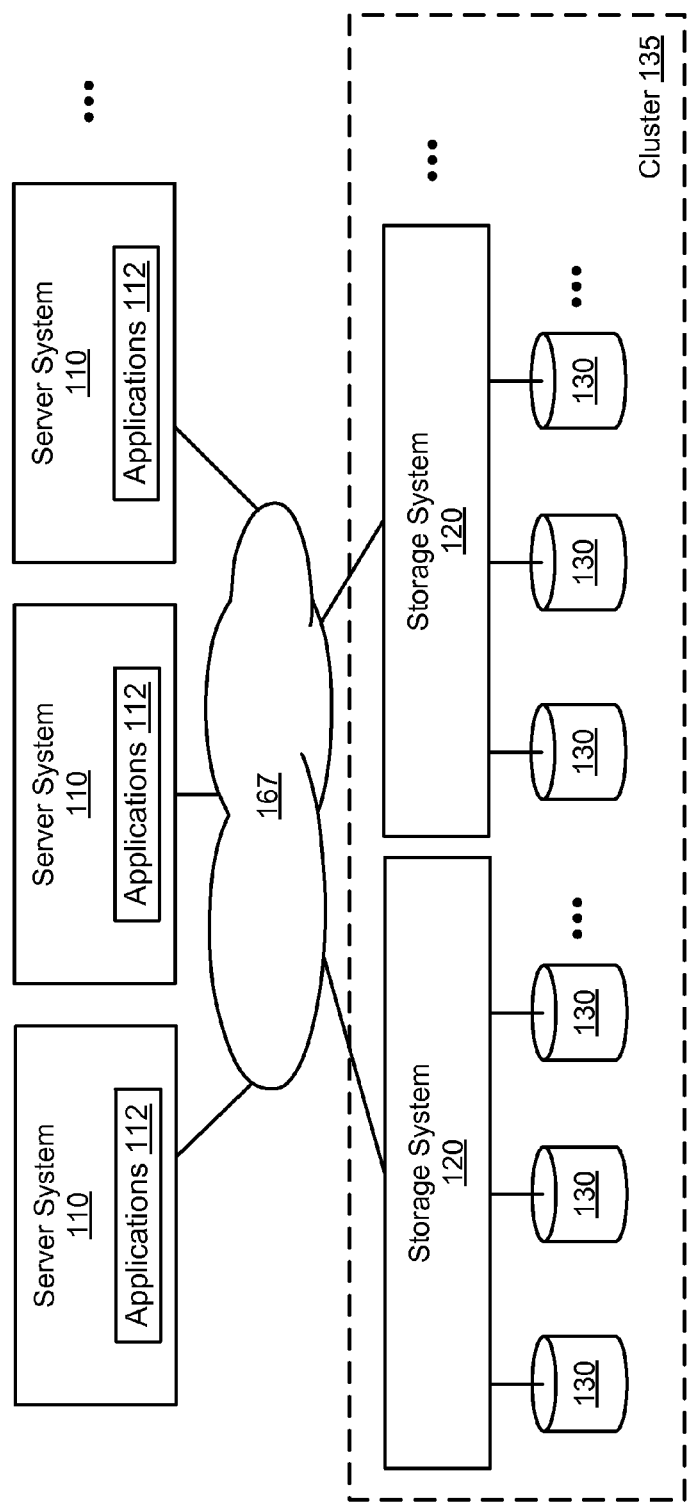
FIG. 1 is a schematic diagram of an exemplary distributed storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I contains terms used herein. Section II describes a cluster storage system environment in which some embodiments operate. Section III describes a system and method for retaining deduplication in a volume after a volume clone split operation.

I. Terms

Storage object: As used herein, a storage object comprises any type of container for storing data. Examples of storage objects include, but are not limited to, files, LUs, qtrees, volumes, flexible volumes, aggregates, storage devices, etc. For illustrative purposes, the embodiments below are described in relation to a flexible volume, e.g., base flexible volume, flexible volume clone, flexible volume clone hierarchy, etc. However, in other embodiments, any other type of storage object may be used in the embodiments below.

Clone: As used herein, a clone may comprise an instant replication of a storage object without requiring additional storage space at the time of creation. A clone of a storage object may comprise a transparent virtual copy of data of the storage object and does not require any copying of data. A clone of a storage object is derived from and based on the storage object. For example, the clone may comprise a virtual image of the storage object, a pointer to the storage object, or a pointer to an image of the storage object. For example, the clone may comprise a virtual image or a pointer to the base storage object. As such, a clone may comprise a virtual container that may be provisioned, sized, and resized dynamically to simplify operations. However, incremental storage capacity is only needed for clone-specific metadata and non-redundant data blocks. In some embodiments, the clone stores data comprising changes between the base storage object and the clone. When a clone is created, it uses the base storage object and/or a snapshot image of the base storage object to use as its base. For example, a clone may comprise a pointer to an image of a storage object and a delta data, whereby the image is produced at a first time point and the clone is produced at a second time point after the first time point. The delta data of the clone may comprise changes to the storage object between the first time point and the second time point. The clone receives a copy of the snapshot image metadata and then updates its metadata as the clone is written. The common snapshot between the base storage object and the clone is read only and may be reused as the base for multiple clones. Thus, storage device space is saved because new device space used is associated with small amounts of metadata or meaningful changes to either the base storage object or the clone. Thus, the clone may comprise a writeable point-in-time image of a base storage object or even of another clone of a base storage object. As such, clones add a new level of agility and efficiency to storage operations. For illustrative purposes, the embodiments below are described in relation to a flexible volume clone. However, in other embodiments, any other type of clone may be used in the embodiments below.

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Flexible volume: As used herein, a flexible volume may comprise a type of storage volume that may be efficiently distributed across a plurality of storage devices and may be resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprises at least one storage device. The storage aggregate may be abstracted over a RAID plex where each plex comprises a RAID group. Moreover, each RAID group may comprise a plurality of storage disks. As such, a flexible volume may comprise data storage spread over multiple storage disks or devices.

Base flexible volume: As used herein, a base flexible volume comprises a volume that is not a clone of a flexible volume. For example, a base flexible volume may be a flexible volume that has been cloned. As such, a base flexible volume may be considered to be a base volume that is depended upon by at least one flexible volume clone. The flexible volume clone may be considered to be a child flexible volume.

Snapshot: As used herein, a snapshot comprises a feature that creates an online, read-only copy of a file system. The snapshot may protect against accidental deletions or modifications of files without duplicating file contents. In some embodiments, a snapshot is utilized by a flexible volume clone to create a point in time view or image of a base flexible volume. When a file is changed, the snapshot copy (or resulting flexible volume clone)may still point to the storage device blocks where the file existed before it was modified and changes are written to new storage device blocks. As data is changed in the base flexible volume, the original data blocks stay associated with the snapshot copy rather than getting marked for reuse.

Delta data: As used herein, delta data comprises a difference between the base flexible volume and its flexible volume clone. For example, a flexible volume clone delta may comprise changes or differences between the base flexible volume and the flexible volume clone that have been stored or written to new storage device blocks.

Virtual Volume Block Number: As used herein, a virtual volume block number (VVBN) may specify a data block's offset within a container file. For example, a virtual volume block number may comprise a block address within a flexible volume's virtual block address space. In some embodiments, the virtual volume block number may comprise a block address within a flexible volume clone's virtual block address space. As such, a virtual volume block number may comprise a virtual address pointer.

Physical Volume Block Number: As used herein, a physical volume block number (PVBN) may specify a data block's location within a storage aggregate. For example, a physical volume block number may specify a location within a storage aggregate for a data block of a flexible volume. In some embodiments, the physical volume block number may specify a location or address within a storage aggregate for a data block of a flexible volume clone. As such, a physical volume block number may comprise a physical address pointer.

Consistency Point: As used herein, a Consistency Point (CP) may refer to a write episode or point of a file system (e.g., a Write Anywhere File Layout) for performing a plurality of write allocations of data blocks. As such, each CP may comprise a plurality of write allocations such that each CP results in a consistent on disk file system image. In some embodiments, a WAFL system may log all incoming write allocation requests to a memory log. As such, the log comprising the write allocation requests may be used to determine which data blocks need to be updated or written to at a CP.

Inode: As used herein, an inode may refer to file specific information. As such, each file on a storage system or in a flexible volume or flexible volume clone may be associated with an inode. In some embodiments, the inode may comprise file related metadata and pointers to data blocks.

Deduplication: As used herein, deduplication may refer to a data compression technique for eliminating redundant data. In some embodiments, deduplication of a volume may result in storage of data on a storage device once and multiple references within the volume may point to the single instance of the stored data. For example, a storage object (e.g., a volume) may comprise a plurality of data blocks. Each data block may comprise pointers that reference to a same block within a storage device. As such, a plurality of data blocks of a storage object may each point to a single block within a storage device.

Split: As used herein, a split operation may refer to making a clone of a storage object (e.g., a flexible volume clone) independent of its base storage object (e.g., a base flexible volume). In some embodiments, the split of a clone from its base storage object results in a new storage object (e.g., the clone now being a volume or a flexible volume) that does not share data blocks with another storage object (e.g., a base flexible volume of a clone). For example, a split operation of a flexible volume clone may result in data blocks of the flexible volume clone that are shared with the base flexible volume having a new physical volume block number assigned to the data blocks of the flexible volume clone.

II. Cluster Storage System Environment

FIG. 1 is a block diagram of an exemplary virtual server environment 100 in which some embodiments operate. The environment 100 may comprises a set of one or more server systems and one or more storage systems 120. The server systems 110 may each access one or more storage systems 120 that are connected to the server systems 110 via a network 167. The one or more storage systems 120 comprise a cluster storage system 135. Each storage system 120 in the cluster 135 may comprise a set of storage devices 130 for storing client data, the storage devices 130 of the cluster 135 comprising a shared storage of the storage system 120. Note that the server systems 110 are also connected to each other (e.g., via network 167) for communicating with each other (e.g., for working collectively to provide data-access service to a user/client system (not shown) for collectively hosting a plurality of virtual machines as described herein).

A server system 110 may comprise a computer system that may execute one or more applications 112 that interacts with the storage systems 120 for receiving read/write access requests and receiving or transmitting data over the network 167. In some embodiments, a server system 110 may comprise a chassis hosting multiple instances of server systems 110, each server system 110 hosting multiple client systems embodied as virtual machines. The network 167 and/or subnets of networks 167 may be physically embodied within such a chassis.

An application 112 executing on a server system 110 may provide data-access services by transmitting and processing access requests for data from the storage system(s) 120. In turn, an application 112 utilizes the services of the storage system 120 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. An application 112 may comprises a non-virtual based application, such as a typical email exchange application or database application. In other embodiments, an application 112 may comprise a virtual-based application, such as a virtual machine (discussed below).

A storage system 120 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Each storage system 120 may have a distributed architecture. For example, each storage system 120 may include separate N module (network module) and D module (data module) components (not shown). In such an embodiment, the N module is used to communicate with the server systems 110, while the D module includes the file system functionality and is used to communicate with the storage devices 130. In another embodiment, the storage system 120 may have an integrated architecture, where the network and data components are all contained in a single box or unit. The storage system 120 may be coupled through a switching fabric (not shown) to other storage systems 120 in the cluster 135. In this way, all the storage systems 120 of the cluster 135 may be interconnect to form a single storage pool that may be accessed by the connected server systems 110.

The storage systems 120 comprise functional components that cooperate to provide a distributed storage system architecture providing consolidated data services to the server systems 110. A server system 110 may comprise a computer system that utilizes services of the cluster storage system 135 to store and manage data in the storage devices 130 of the storage systems 120. Interaction between a server system 110 and a storage system 120 can enable the provision of storage services. That is, server system 110 may request the services of the storage system 120, and the storage system 120 may return the results of the services requested by the server system 110, by exchanging packets over the connection system 167. The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of storage devices 130, preferably on one or more writable storage device media (such as magnetic storage devices, video tape, optical, DVD, magnetic tape, and any other similar media adapted to store information, including data and parity information). The storage system 120 may implement a file system to logically organize the data as storage objects on the storage devices 130.

A storage system 120 or a server system 110 may execute one or more applications 112 that submit access requests for accessing particular storage objects on the storage devices 130.

Interaction between the server systems 110 and the storage system(s) 120 can enable the provision of storage services. That is, the server systems 110 may request the services of the storage system(s) 120 (by submitting read/write access requests), and the storage system(s) 120 may respond to read/write access requests of the server systems 110 by receiving or transmitting data to the server systems 110 over the network 167 (e.g., by exchanging data packets through a connection over the network 167).

Communications between a storage system 120 and any of server systems 110 are typically embodied as packets sent over the computer network 167. A server system 110 may send an access request (a read/write access request) to the storage system 120 for accessing particular data stored on the storage system. The server system 110 may request the services of the storage system 120 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), or Internet Small Computer System Interface (iSCSI) Storage Area Network (SAN) access—when accessing data in the form of blocks.

Each application 112 executing on a server system 110 may utilize services of the cluster 135 to store and access its data. The storage system 120 may comprise a computer system that stores data in a set of one or more storage devices 130 as storage objects. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

Figure 2:
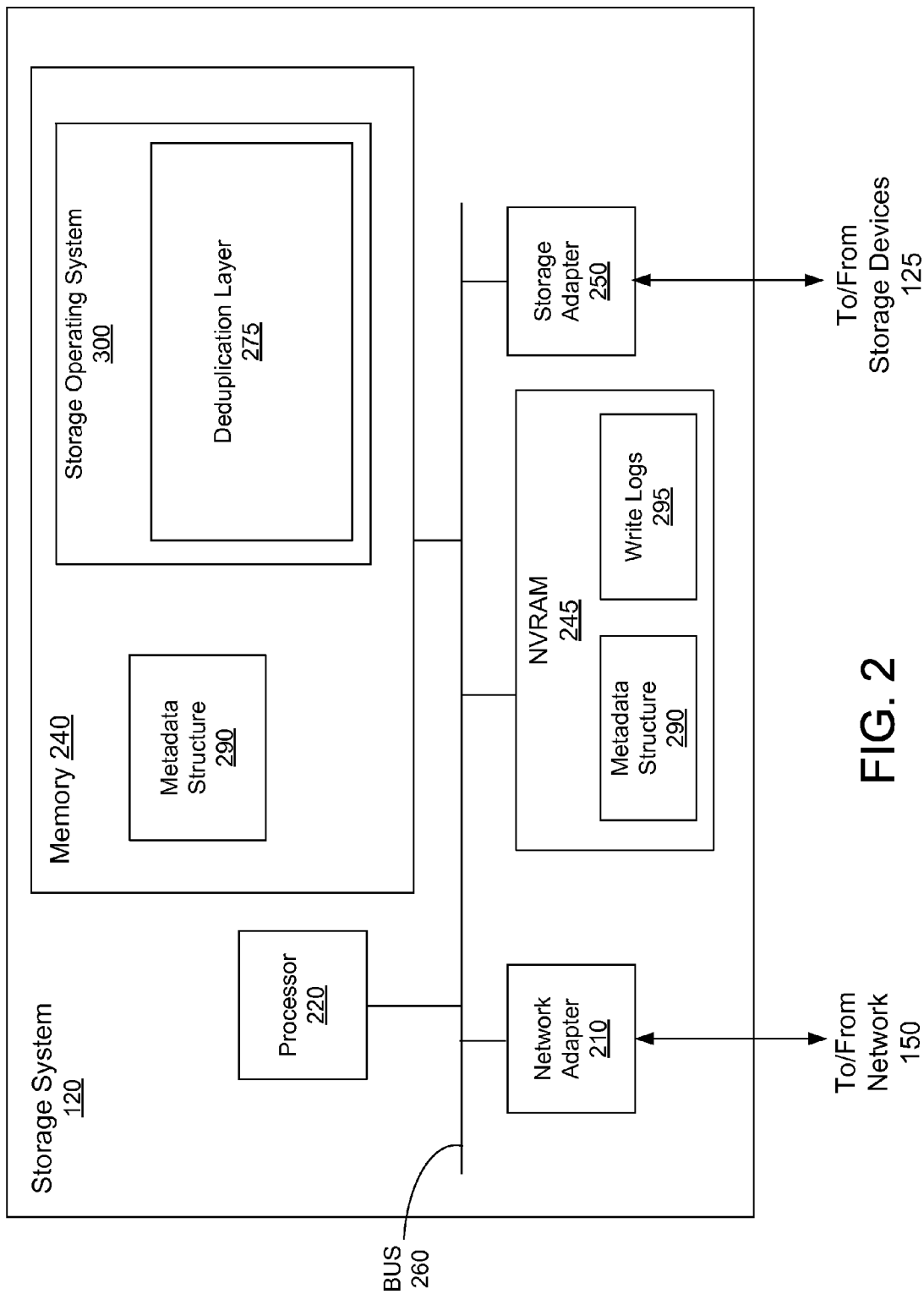
FIG. 2 is a schematic diagram of an exemplary storage system that may be employed in the storage system environment in which some embodiments operate.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a stand-alone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 245.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a deduplication layer 275) that are executed by the processor 220. In some embodiments, the deduplication layer 275 is implemented to deduplicate data of a volume clone. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a metadata structure 290 is also resident in memory 240. In other embodiments, the metadata structure 290 may also be resident in NVRAM 245 or stored on a storage device 125. As discussed below, in some embodiments, the metadata structure 290 is produced and used by the deduplication layer 275 to store metadata for sequences of stored blocks and is used to determine how to process write allocations for the blocks. In these embodiments, the metadata structure 290 is sometimes referred to as a block-comparison mechanism. In other embodiments, the metadata structure 290 is also used by the deduplication layer 275 to record mappings of deduplicated redundant blocks to their corresponding matching stored blocks. In these embodiments, the metadata structure 290 is sometimes also referred to as a mapping mechanism.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 125 may comprise disk devices that are arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
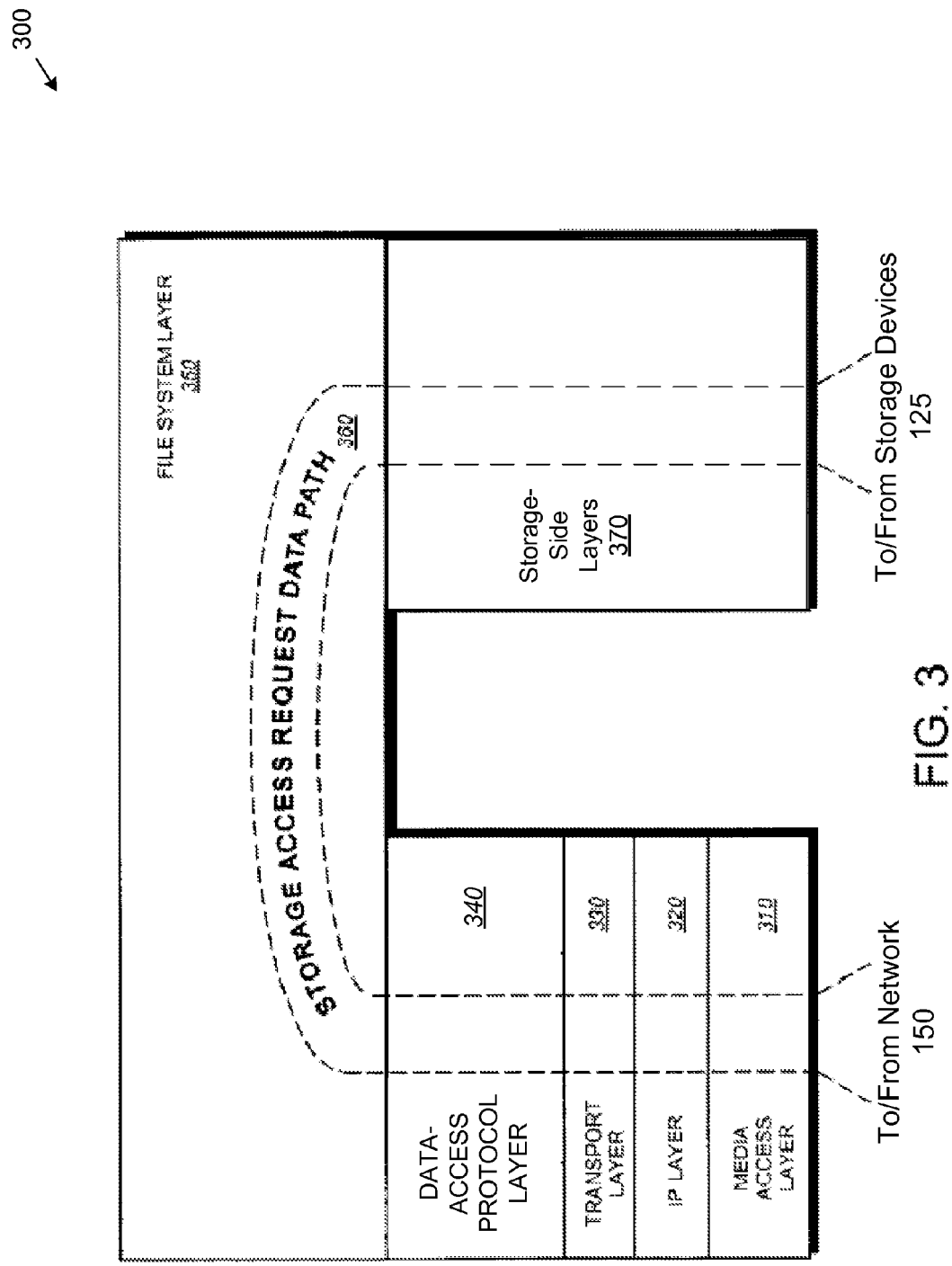
FIG. 3 is a schematic diagram of a set of software layers that form an integrated protocol software stack used in a storage operating system in accordance with some embodiments.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

Figure 4:
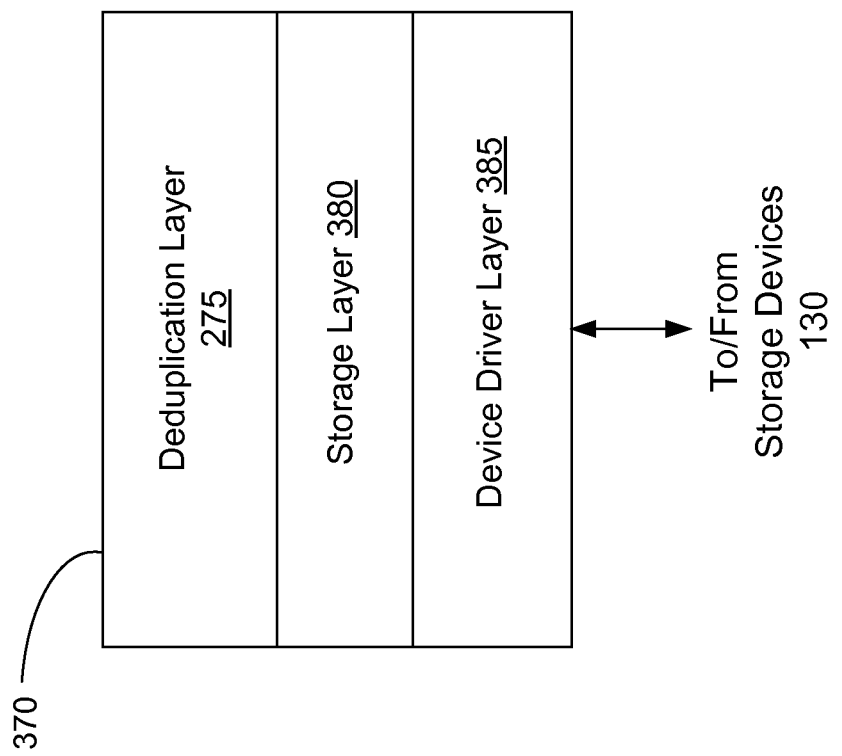
FIG. 4 is a schematic diagram of storage-side layers for implementing a storage protocol for an exemplary storage system in which some embodiments operate.

The storage operating system 300 may manage the storage devices 125 using storage-side layers 370. As shown in FIG. 4, the storage-side layers 370 may include a storage layer 380 that implements a storage protocol (such as a RAID protocol) and a device driver layer 385 that implements a device control protocol (such as small computer system interface (SCSI), integrated drive electronics (IDE), etc.). Bridging the storage-side layers 370 with the network and protocol layers is a file system layer 350 of the storage operating system 300. In an illustrative embodiment, the file system layer 350 implements a file system having an on-disk format representation that is block-based using inodes to describe the files.

The file system layer 350 assigns, for each file, a unique inode number and an associated inode. An inode may comprise a data structure used to store metadata information about the file (such as name of the file, when the file was produced or last modified, ownership of the file, access permission for the file, size of the file, etc.). Each inode may also contain information regarding the block locations of the file. In some embodiments, the block locations are indicated by a unique logical block number (LBN) given for each block of the file. As discussed below, if a storage device comprises a disk device, a set of blocks having sequential LBNs indicates that the set of blocks are stored sequentially on a same track of the disk device. The file system 350 may store and maintain an inode file that contains and indexes (by inode number) the inodes of the various files.

In response to receiving a file-access request (containing an external file handle) from a server system 110, the file system 350 generates operations to load (retrieve) the requested data from storage devices 125 (if it is not resident in the storage system's memory 240). The external file handle in the access request typically identifies a file or directory requested by the server system 110. Specifically, the file handle may specify a generation number, inode number and volume number corresponding to the requested data. If the information is not resident in the storage system's memory 240, the file system layer 350 indexes into the inode file using the received inode number to access the appropriate inode entry for the identified file and retrieve file location information (e.g., logical block number) from the inode.

The file system layer 350 then passes the logical block number to the appropriate driver (for example, an encapsulation of SCSI implemented on a fibre channel interconnection) of the device driver layer 385. The device driver layer 385 accesses the appropriate blocks from the storage devices 125 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage operating system 300 also comprises a deduplication layer 275 that operates in conjunction with the other software layers and file system of the storage operating system 300 to deduplicate data stored on the storage system 120 as described herein. For example, in some embodiments, the deduplication layer 275 may reside between the file system layer 350 and the storage layer 380 of the storage operating system 300 (as shown in FIGS. 3 and 4). In other embodiments, the deduplication layer 275 may reside near other layers of the storage operating system 300.

In some embodiments, the storage-side layers 370 also include a de-staging layer 375. For example, in some embodiments, the de-staging layer 375 may reside between the file system layer 350 and the deduplication layer 275 of the storage operating system 300. In other embodiments, the de-staging layer 375 may reside near other layers of the storage operating system 300.

The de-staging layer 375 may be implemented in some storage systems 125 to perform received write requests for files in two stages. In a first stage, write requests received by the file system layer 350 are sent to the de-staging layer 375, a write request containing blocks of data to be written. The de-staging layer 375 produces a write log for each received write request, a write log containing the blocks of data to be written. The write logs 295 may be stored, for example, to the NVRAM 245 (as shown in FIG. 2). In a second stage, at predetermined time intervals (referred to as consistency points), accumulated write logs 295 (e.g., in the NVRAM 245) are sent to the storage layer 380 which then writes the blocks of data in the write logs to a storage device 125.

Embodiments described herein may be applied to a storage system 120 that is implemented with or without a de-staging layer 375. In some embodiments, the deduplication layer 275 is used in conjunction with the de-staging layer 375. In these embodiments, the deduplication layer 275 may process the write logs accumulated during the first stage that are awaiting the next consistency point to be written to a storage device 125. During this time, the deduplication layer 275 may process the blocks in the accumulated write logs for possible deduplication before the blocks are written to the storage devices 125. In other embodiments, the deduplication layer 275 is used without use of a de-staging layer 375. In these embodiments, the deduplication layer 275 may receive write requests from the file system 350 and process blocks of the write requests for deduplication as they are received.

Note that when a write log for a write request for a file is produced in the first stage, the file system layer 350 may assign LBNs for each block in the file to be written, the assigned LBN of a block indicating the location on a storage device 125 where the block will be written to at the next consistency point. Also, the file system layer 350 may assign an inode number and an inode for the file. As such, each write log may comprise blocks of data to be written, the locations (LBNs) of where the blocks are to be written, and an inode number assigned to the file. When a write log for a write request for a file is produced in the first stage, the file system layer 350 may also store LBNs for the blocks of the file in its assigned inode.

In other embodiments where the deduplication layer 275 is used without the de-staging layer 375, the deduplication layer 275 may receive write requests for files from the file system 350, whereby the file system layer 350 may assign LBNs for each block in the file to be written. Also, the file system layer 350 may assign an inode number and an inode for the file and store the assigned LBN for the blocks of the file in its assigned inode.

In some embodiments, the deduplication layer 275 may be pre-included in storage operating system 300 software. In other embodiments, the deduplication layer 275 may comprise an external auxiliary plug-in type software module that works with the storage operating system 300 to enhance its functions. As such, the deduplication layer 275 may be imposed upon an existing storage operating system 300 and file system 350 to provide deduplication of data as described herein.

As shown in FIG. 4, the storage-side layers 370 may include a storage layer 380 that implements a storage protocol (such as a RAID protocol) and a device driver layer 385 that implements a device control protocol (such as small computer system interface (SCSI), integrated drive electronics (IDE), etc.). Bridging the storage-side layers 370 with the network and protocol layers is a file system layer 350 of the storage operating system 300. In an illustrative embodiment, the file system layer 350 implements a file system having an on-disk format representation that is block-based using inodes to describe the files.

The file system layer 350 assigns, for each file, a unique inode number and an associated inode. An inode may comprise a data structure used to store metadata information about the file (such as name of the file, when the file was produced or last modified, ownership of the file, access permission for the file, size of the file, etc.). Each inode may also contain information regarding the block locations of the file. In some embodiments, the block locations are indicated by a unique logical block number (LBN) given for each block of the file. As discussed below, if a storage device comprises a disk device, a set of blocks having sequential LBNs indicates that the set of blocks are stored sequentially on a same track of the disk device. The file system 350 may store and maintain an inode file that contains and indexes (by inode number) the inodes of the various files.

In response to receiving a file-access request (containing an external file handle) from a server system 110, the file system 350 generates operations to load (retrieve) the requested data from storage devices 130 (if it is not resident in the storage system's memory 240). The external file handle in the access request typically identifies a file or directory requested by the server system 110. Specifically, the file handle may specify a generation number, inode number and volume number corresponding to the requested data. If the information is not resident in the storage system's memory 240, the file system layer 350 indexes into the inode file using the received inode number to access the appropriate inode entry for the identified file and retrieve file location information (e.g., logical block number) from the inode.

The file system layer 350 then passes the logical block number to the appropriate driver (for example, an encapsulation of SCSI implemented on a fibre channel interconnection) of the device driver layer 385. The device driver layer 385 accesses the appropriate blocks from the storage devices 130 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage operating system 300 also comprises a deduplication layer 275 that operates in conjunction with the other software layers and file system of the storage operating system 300 to deduplicate data stored on the storage system 120 as described herein. For example, in some embodiments, the deduplication layer 275 may reside between the file system layer 350 and the storage layer 380 of the storage operating system 300 (as shown in FIGS. 3 and 4). In other embodiments, the deduplication layer 275 may reside near other layers of the storage operating system 300.

In some embodiments, the storage-side layers 370 also include a de-staging layer 375. For example, in some embodiments, the de-staging layer 375 may reside between the file system layer 350 and the deduplication layer 275 of the storage operating system 300. In other embodiments, the de-staging layer 375 may reside near other layers of the storage operating system 300.

The de-staging layer 375 may be implemented in some storage systems 130 to perform received write requests for files in two stages. In a first stage, write requests received by the file system layer 350 are sent to the de-staging layer 375, a write request containing blocks of data to be written. The de-staging layer 375 produces a write log for each received write request, a write log containing the blocks of data to be written. The write logs 295 may be stored, for example, to the NVRAM 245 (as shown in FIG. 2). In a second stage, at predetermined time intervals (referred to as consistency points), accumulated write logs data structure in the NVRAM 245 are sent to the storage layer 380 which then writes the blocks of data in the write logs to a storage device 130.

Embodiments described herein may be applied to a storage system 120 that is implemented with or without a de-staging layer 375. In some embodiments, the deduplication layer 275 is used in conjunction with the de-staging layer 375. In these embodiments, the deduplication layer 275 may process the write logs accumulated during the first stage that are awaiting the next consistency point to be written to a storage device 125. During this time, the deduplication layer 275 may process the blocks in the accumulated write logs for possible deduplication before the blocks are written to the storage devices 125. In other embodiments, the deduplication layer 275 is used without use of a de-staging layer 375. In these embodiments, the deduplication layer 275 may receive write requests from the file system 350 and process blocks of the write requests for deduplication as they are received.

Note that when a write log for a write request for a file is produced in the first stage, the file system layer 350 may assign LBNs for each block in the file to be written, the assigned LBN of a block indicating the location on a storage device 130 where the block will be written to at the next consistency point. Also, the file system layer 350 may assign an inode number and an inode for the file. As such, each write log may comprise blocks of data to be written, the locations (LBNs) of where the blocks are to be written, and an inode number assigned to the file. When a write log for a write request for a file is produced in the first stage, the file system layer 350 may also store LBNs for the blocks of the file in its assigned inode.

In other embodiments where the deduplication layer 275 is used without the de-staging layer 375, the deduplication layer 275 may receive write requests for files from the file system 350, whereby the file system layer 350 may assign LBNs for each block in the file to be written. Also, the file system layer 350 may assign an inode number and an inode for the file and store the assigned LBN for the blocks of the file in its assigned inode.

In some embodiments, the deduplication layer 275 may be pre-included in storage operating system 300 software. In other embodiments, the deduplication layer 275 may comprise an external auxiliary plug-in type software module that works with the storage operating system 300 to enhance its functions. As such, the deduplication layer 275 may be imposed upon an existing storage operating system 300 and file system 350 to provide deduplication of data as described herein.

Figure 5:
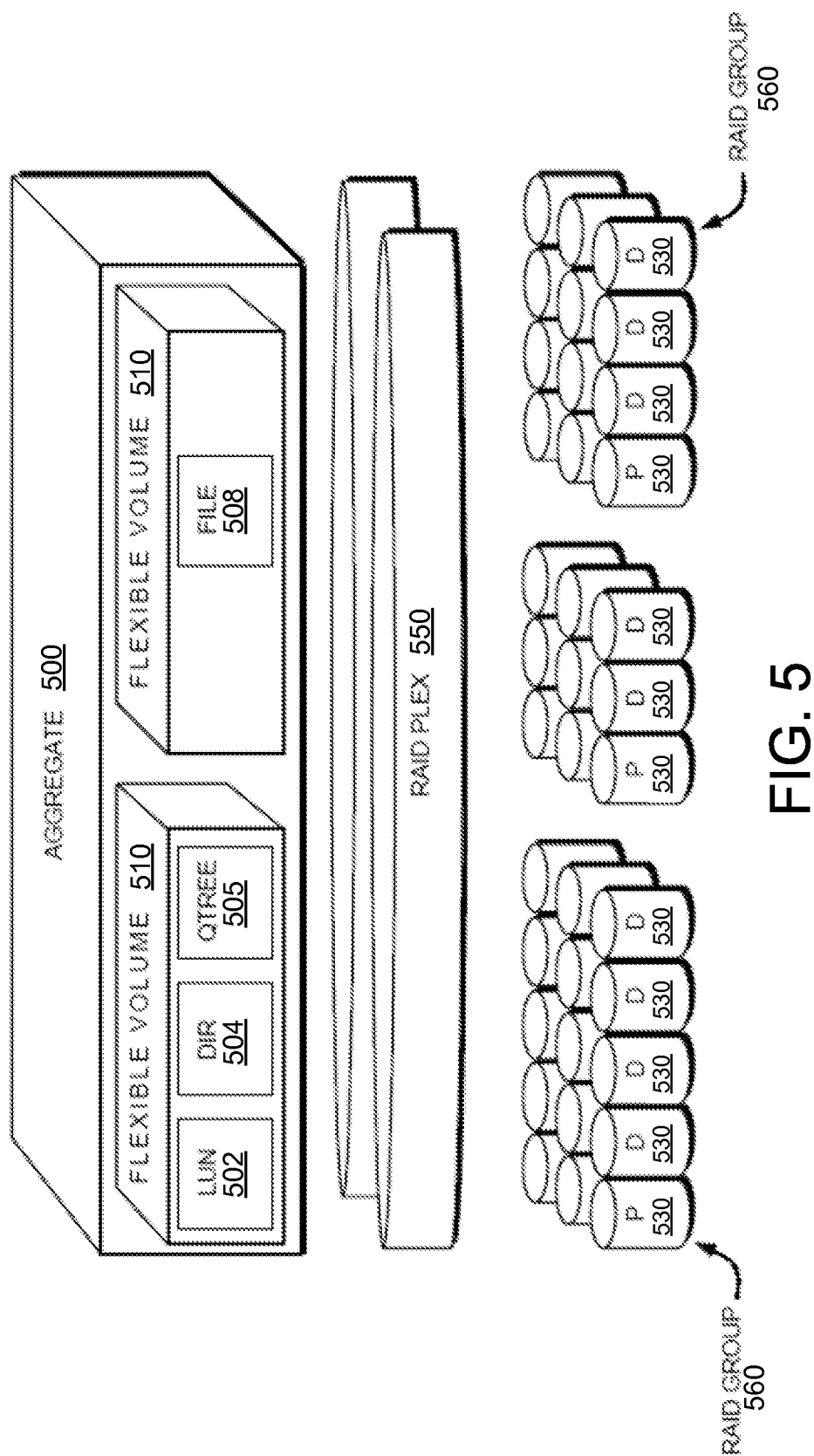
FIG. 5 is a schematic block diagram of an embodiment of an aggregate (system or data aggregate) that may be used in some embodiments.

FIG. 5 is a schematic block diagram of an embodiment of an aggregate 500 (system or data aggregate) that may be used in some embodiments. The total storage space of an aggregate 500 may be allocated among a set of one or more flexible volumes 510. A flexible volume 510 may be dynamically increased or decreased in storage size within the total storage space of the aggregate 500. Each flexible volume 510 may comprise one or more storage objects, such as, Luns (blocks) 502, directors 504, qtrees 506, files 508, etc. The aggregate 500 is illustratively layered on top of a RAID system, which is represented by at least one RAID plex 550 (depending upon whether the storage configuration is mirrored), wherein each RAID plex 550 comprises at least one RAID group 550. Each RAID group 550 further comprises a plurality of storage disks 530, e.g., one or more data disks and at least one parity disk.

Figure 6:
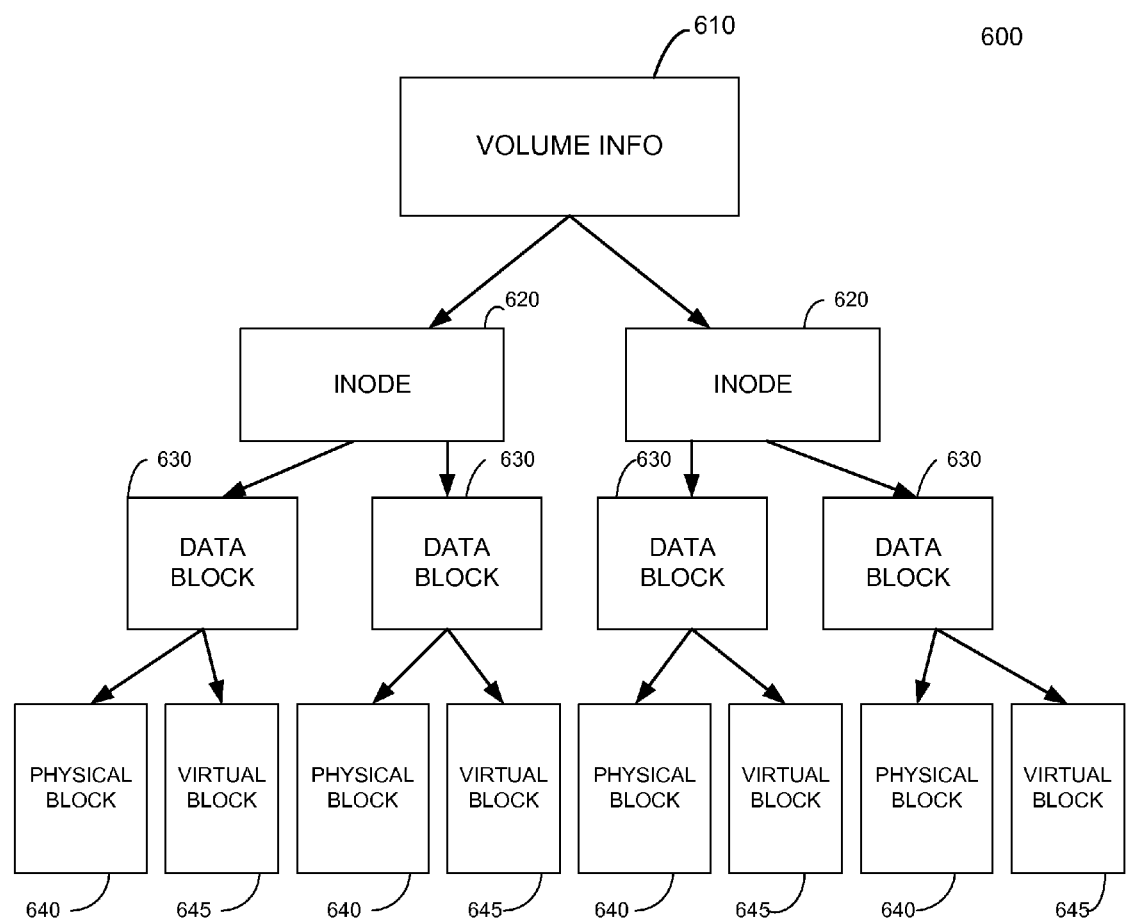
FIG. 6 is a block diagram of a file structure comprising various data structures in accordance with some embodiments.

III. Retaining Deduplication in a Resulting Volume after a Volume Clone Split Operation FIG. 6 is a block diagram 600 of an exemplary file structure comprising various data structures. In some embodiments, the file structure may be used in a Write Anywhere File Layout (WAFL) file system. For example, the file structure may comprise a volume 610. In some embodiments, the volume 610 may comprise a flexible volume or a flexible volume clone. A flexible volume may comprise a base flexible volume and as such does not depend on another flexible volume. The flexible volume may comprise a clone of a flexible volume. As such, the volume 610 may comprise a writable point-in-time image (e.g., a snapshot) of a base flexible volume and comprises a delta flexible volume portion for storing space to hold any desired changes from the base flexible volume. As such, in some embodiments, the flexible volume clone comprises a writable point-in-time image of the base flexible volume (e.g., based on a snapshot of the base flexible volume) with a delta flexible volume clone portion that stores any desired changes to the base flexible volume that the flexible volume clone is dependent or derived from.

In some embodiments, the volume 610 may comprise a volume info block that may comprise information related to a data structure tree for the volume 610. The volume info block may comprise an inode file that may describe or comprise all of the inodes in the volume 610 and a block map file that may comprise a block allocation bitmap of the volume 610.

The volume 610 may store one or more files. Each file may be described by an inode 620. In some embodiments, an inode 620 comprises metadata about a file, file size, file type, and pointers to data blocks for a file.

Each inode 620 may comprise one or more data blocks 630. In some embodiments, each data block 630 may comprise a plurality of pointers. For example, each data block 630 may comprise a virtual volume block number (VVBN) and a physical volume block number (PVBN). A virtual volume block number may reference the associated logical block number or virtual block number of a volume (e.g., a flexible volume clone) and a corresponding physical volume block number may reference a physical block in the storage aggregate. For example, a physical volume block number may reference or provide a pointer to a physical block 640 and a virtual volume block number may reference or provide a pointer to a logical or virtual block 645. As such, each data block of an inode may comprise a VVBN-PVBN pairing such that the virtual volume block number references a logical or virtual block number of the volume and the physical volume block number references a physical block number in the storage device or storage aggregate.

Thus, a volume (e.g., a flexible volume clone) may be associated with two volume block numbers for each block of data (e.g., a virtual volume block number and a physical volume block number). The virtual volume block number may comprise an address of a logical or virtual block of data in the flexible volume clone and the physical volume block number may comprise an address of a physical block of data of flexible volume clone in a storage aggregate.

Figure 7:
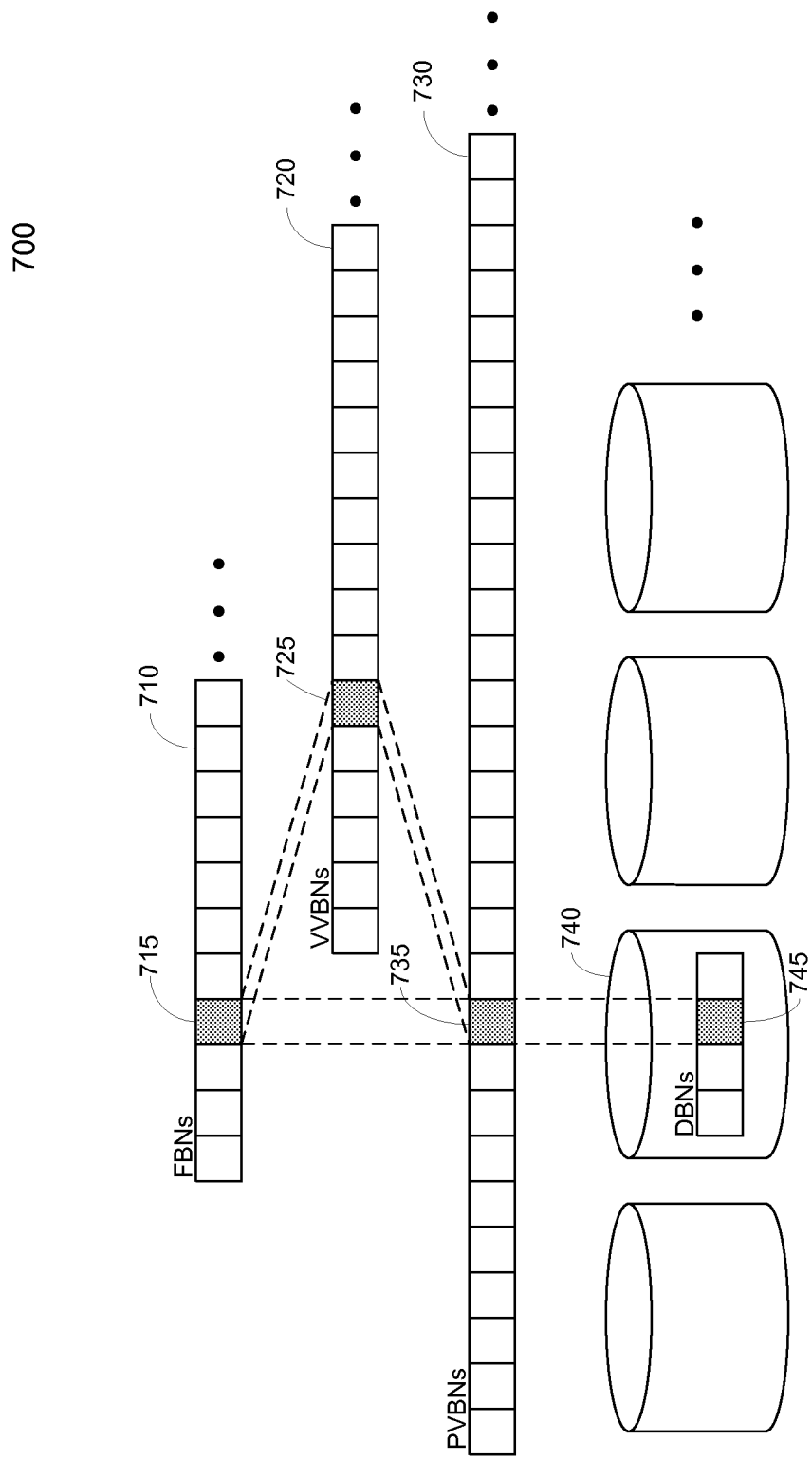
FIG. 7 is an exemplary mapping of a block from a file to a block of a storage device of a storage aggregate in accordance with some embodiments.

FIG. 7 is a mapping 700 of a block from a file to a block of a storage device of a storage aggregate. The storage aggregate may comprise information of each volume or flexible volume. For example, the storage aggregate may comprise a RAID file and a container file for each volume. The RAID file may comprise metadata describing a volume (e.g., a flexible volume clone), such as the name of the volume, file system identifier, current state of the volume, size of the volume, and other information associated with the volume. The container file may comprise information about all of the blocks of the volume. For example, block addresses used within a volume may refer to block offsets within the volume's container file. As such, the container file may comprise information about every block within a volume. Thus, the container file of a volume may comprise two implementations of referring to a location (e.g., within a flexible volume clone and a storage aggregate) of a given data block of the volume. Such implementations may comprise the physical volume block number and the virtual volume block number. The physical volume block number specifies the data block's location within the storage aggregate. In some embodiments, the physical volume block number may be used to read or write the block to the RAID storage aggregate. The virtual volume block number may specify the data block's offset within the container file or flexible volume or flexible volume clone.

As seen in FIG. 7, the mapping 700 may comprise a file 710 that comprises a plurality of file blocks. Each file block may be associated with a file block number. A single block may be part of several logical or virtual and physical storage containers or associations. For example, a file block number 715 may be associated with a volume (e.g., a flexible volume clone), storage aggregate, and a storage device. As seen, the file block 715 may be associated with a volume or container file 720. For example, the file block number 715 may be mapped or associated with virtual volume block number 725 of the volume or container file 720. Similarly, the virtual volume block number 725 may be associated with a storage aggregate. For example, the virtual volume block number 725 may point to or be mapped to physical volume block number 735 of the storage aggregate 730. The physical volume block number 735 may point to or be mapped to a storage device. For example, the physical volume block number 735 may point to or be mapped to device block number 745 of a storage device 740. As such, the file, volume container file, storage aggregate, and storage device comprise an array of blocks indexed by block numbers.

As such, the volume's block address space may be defined by the container file. A file writing system may use the container file to translate virtual volume block numbers to a block address in the aggregate's block address space (e.g., a physical volume block number). The volume may comprise an array of physical volume block numbers indexed by virtual volume block numbers. Such information may be comprised within a container map that comprises a virtual volume block number to physical volume block number mapping (e.g., a VVBN-PVBN map).

Figure 8:
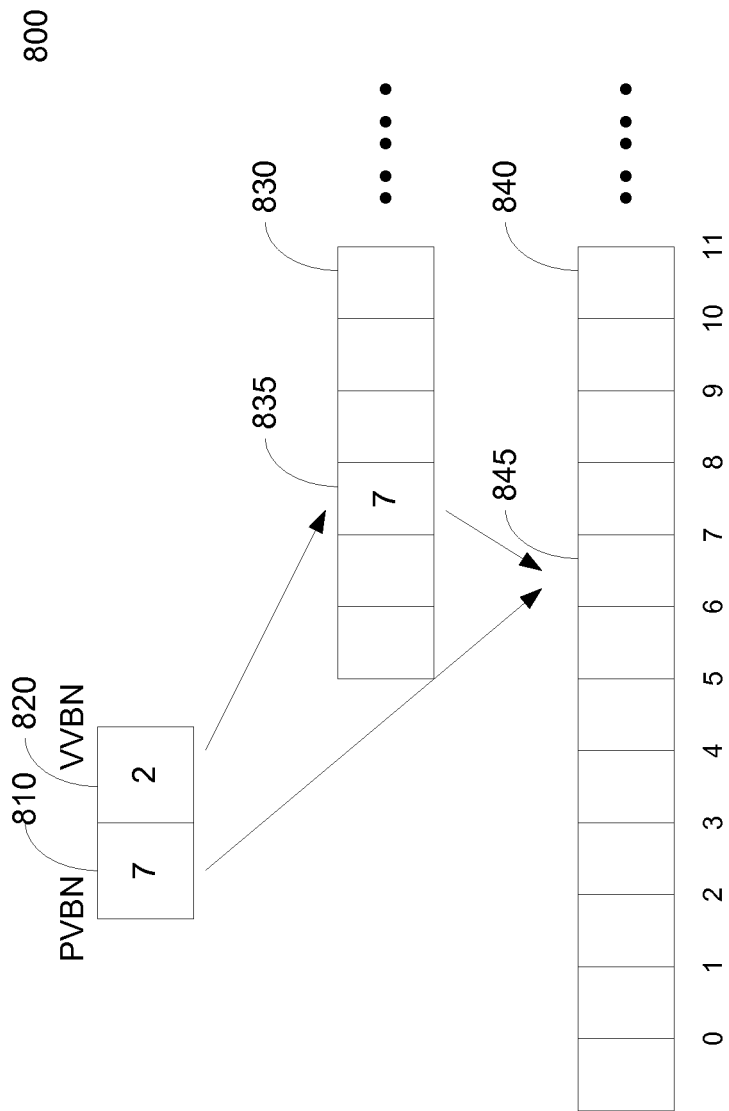
FIG. 8 is an exemplary mapping of dual block numbers of a data block of a volume in accordance with some embodiments.

FIG. 8 is a mapping 800 of dual block numbers. In some embodiments, a data block of a volume may comprise dual virtual block numbers. For example, a volume (i.e., flexible volume or a flexible volume clone) may comprise a plurality of inodes. Each inode comprises at least one data block pointer comprising a virtual volume block number and a physical volume block number. As seen in FIG. 8, a physical volume block number 810 may comprise a pointer to aggregate block 845 within the storage aggregate 840. Moreover, the virtual volume block number 820 may comprise a pointer to block number 835 of the container map 830. The block number 835 may provide a pointer to storage aggregate block 845 of the storage aggregate 840. As such, each virtual volume block number may be associated with a physical volume block number. In some embodiments, the association between the virtual volume block number and the physical volume block number may be stored within a VVBN-PVBN map. In some embodiments, a plurality of virtual volume block numbers may be associated with a single physical volume block number. For example, a first virtual volume block number and a second virtual volume block number may both be associated with a single physical volume block number. As such, the first virtual volume block number and the second virtual volume block number point to an identical block within the storage aggregate.

Figure 9:
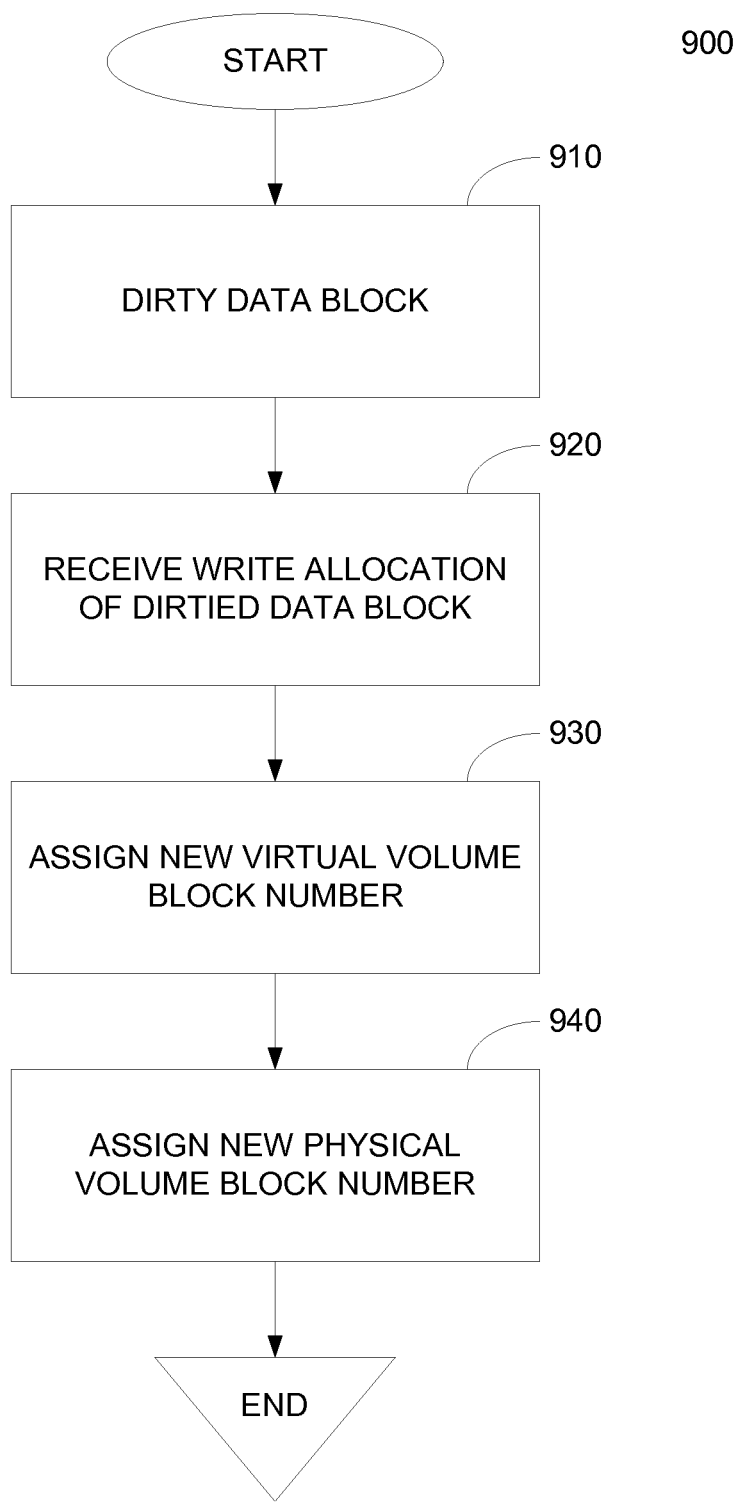
FIG. 9 is a flowchart of a method for marking a data block as dirty and processing the data block with the dirty marking in accordance with some embodiments.

FIG. 9 is a flowchart of a method 900 for marking a data block as dirty and processing the data block with the dirty indicator or marking. As will be discussed, the indicating or marking of a data block as "dirty" may not retain deduplication of a flexible volume clone after a flexible volume clone split operation.

As previously described, a flexible volume clone may comprise one or more inodes and each inode may comprise one or more data blocks. Each data block may comprise dual pointers comprising the virtual volume block number and the physical volume block number. In some embodiments, a plurality of data blocks of the flexible volume clone may comprise identical pointers. As such, a plurality of data blocks of the flexible volume clone may comprise identical virtual volume block numbers and identical physical volume block numbers. Such a configuration may be referred to as deduplication of data of the flexible volume clone.

In some embodiments, the Write Anywhere File Layout system may mark a data block of a volume as 'dirty' or 'fake dirty' (as will be discussed in further detail below). Marking a data block as 'dirty' may comprise setting at least one bit in the data block's header to indicate that the data block has been modified and must be addressed during a write allocation operation.

In some embodiments, splitting a flexible volume clone may comprise a write allocation of data blocks. As previously discussed, the flexible volume clone may comprise pointers to a snapshot of a base flexible volume and a delta data that may comprise a difference in data between the flexible volume clone and the snapshot of the base flexible volume. As such, the flexible volume clone comprises data blocks that are shared with or dependent on the snapshot of the base flexible volume and data blocks that are not shared with the snapshot of the base flexible volume (e.g., the data blocks associated with the delta data of the flexible volume clone). When a flexible volume clone split operation (e.g., an operation to make the flexible volume clone independent of the base flexible volume) is performed, the data blocks that are shared with the snapshot of the base flexible volume may be marked as 'dirty' while the data blocks associated with the delta data may not be marked as 'dirty.' However, as will be discussed in further detail, marking a data block as 'dirty' may not preserve deduplication in the flexible volume clone after it has been split from its base flexible volume.

As seen in FIG. 9, the method 900 may mark (at step 910) as 'dirty' a data block of a flexible volume clone that is shared or dependent on a snapshot of a base flexible volume. In some embodiments, the method 900 may determine that a data block of a flexible volume clone is shared or dependent on a snapshot of a base flexible volume by checking a container file of the flexible volume clone. For example, the method 900 may access a virtual volume block number to physical volume block number (VVBN-PVBN) map of the flexible volume clone that is associated with the container file. In some embodiments, if a data block of a flexible volume clone is shared or dependent upon a snapshot of a base flexible volume, then the physical volume block number of the data block may comprise a hole or a '0' value.

However, if a data block of a flexible volume clone is not shared or dependent upon a snapshot of a base flexible volume (e.g., a data block associated with the delta data of the flexible volume clone), then the physical volume block number of the data block may not comprise a hole or a '0' and may instead specify an address or location within the storage aggregate. Thus, the method 900 may mark data blocks of a flexible volume clone with a physical volume block number of '0' (as indicated in the VVBN-PVBN map) as 'dirty' when performing a volume clone split operation.

The method 900 may (at step 920) receive a write allocation for a dirtied data block. In some embodiments, the write allocation of the dirtied data block may occur during a consistency point (CP). In some embodiments, the Write Anywhere File Layout may collect or gather a plurality of data block updates (e.g., write allocations of data blocks associated with a flexible volume clone that is undergoing a split operation) and write or update a plurality of data blocks at one time (e.g., the consistency point). In some embodiments, the Write Anywhere File Layout may utilize a non-volatile memory to log all incoming data block update requests. As such, the non-volatile memory may comprise a data log of data blocks of the flexible volume clone that are shared with the snapshot of the base flexible volume that require an update or to be written in accordance with splitting the flexible volume clone from the snapshot of the base flexible volume. In some embodiments, the non-volatile memory to log the data block update requests may comprise contents of the NVRAM log as discussed with relation to FIG. 2.

After receiving the write allocation of a dirtied data block, the method 900 may (at step 930) assign a new virtual volume block number to a data block. For example, the method 900 may assign a new virtual volume block number to a data block that is shared with or backed by a snapshot of a base flexible volume after the data block has been dirtied. Moreover, the method 900 may also assign (at step 940) a new physical volume block number to the data block. Thus, the 'dirty' marking of a data block assigns a new virtual volume block number and a new physical volume block number to a data block during a write allocation. As such, the marking of data blocks of a flexible volume clone as 'dirty' would result in the loss of deduplication within data blocks of the flexible volume clone that are shared with the snapshot of the base flexible volume since new virtual volume block numbers and physical volume block numbers are assigned to the data blocks of the flexible volume clone.

Figure 10:
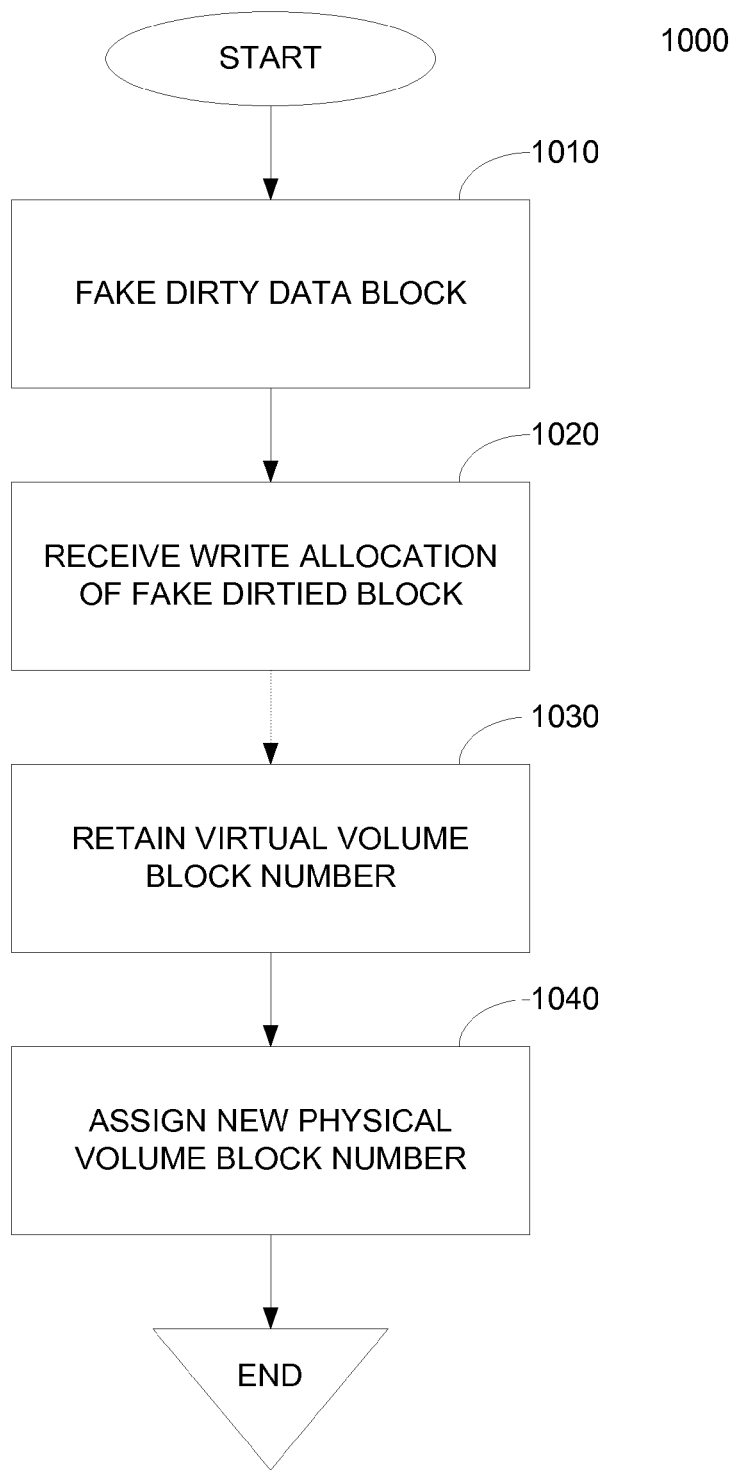
FIG. 10 is a flowchart of a method for marking a data block of a flexible volume clone as fake dirty and processing the data block with the fake dirty marking in accordance with some embodiments.

FIG. 10 is a flowchart of a method 1000 for marking a data block of a flexible volume clone as 'fake dirty' and processing the data block with the fake dirty indicator or marking. In general, marking a data block as 'fake dirty' may comprise retaining a virtual volume block number of a data block and assigning a new physical volume block number to the data block of a flexible volume clone when performing a flexible volume clone split operation.

As previously described, a flexible volume clone may comprise one or more data blocks that may comprise dual pointers comprising the virtual volume block number and the physical volume block number. Similarly, marking a data block of the flexible volume clone as 'fake dirty' may comprise setting at least one bit in the data block's header to indicate that the data block has been modified and must be addressed during a write allocation operation.

In some embodiments, splitting a flexible volume clone so that it is independent from the corresponding snapshot of the base flexible volume may comprise marking a data block as 'fake dirty.' As previously discussed, the flexible volume clone may comprise data blocks with pointers to a snapshot of a base flexible volume and data blocks corresponding to delta data that may comprise a difference in data between the flexible volume clone and the snapshot of the base flexible volume. Thus, the flexible volume clone comprises data blocks that are shared with or dependent on the snapshot of the base flexible volume and data blocks that are not shared with the snapshot of the base flexible volume. When a split operation of a flexible volume clone is performed, the data blocks that are shared with the snapshot of the base flexible volume may be marked as 'fake dirty' while the data blocks associated with the delta data may not be marked as 'fake dirty' since the data blocks corresponding to the delta data are not dependent upon the snapshot of the base flexible volume.

As seen in FIG. 1000, the method 1000 may mark (at step 1010) a data block of a flexible volume clone that is shared or dependent on a snapshot of a base flexible volume as 'fake dirty.' In some embodiments, the method 1000 may determine that a data block of a flexible volume clone is shared or dependent on a snapshot of a base flexible volume by checking a container file of the flexible volume clone. For example, the method 1000 may access the VVBN-PVBN map of the flexible volume clone that is associated with the container file. In some embodiments, if a data block of a flexible volume clone is shared or dependent upon a snapshot of a base flexible volume, then the physical volume block number of the data block may comprise a hole or a '0' value. However, if a data block of a flexible volume clone is not shared or dependent upon a snapshot of a base flexible volume (e.g., a data block associated with the delta data of the flexible volume clone), then the physical volume block number of the data block may not comprise a hole or a '0' and may instead specify an address or location within the storage aggregate. Thus, the method 1000 may mark data blocks of a flexible volume clone with a physical volume block number of '0' as 'fake dirty' when performing a volume clone split operation.

The method 1000 may receive (at step 1020) a write allocation for a data block that has been marked as 'fake dirty.' In some embodiments, the write allocation of the data block marked or indicated as 'fake dirty' may occur at a CP. In some embodiments, the WAFL system may collect or gather a plurality of data block updates (e.g., a data block associated with a flexible volume clone that is undergoing a split operation) and write or update a plurality of data blocks of a volume at one time (e.g., the consistency point). In some embodiments, the Write Anywhere File Layout may utilize a non-volatile memory to log all incoming data block update requests (e.g., data blocks of the flexible volume clone that have been marked as 'fake dirty'). As such, the non-volatile memory may comprise a data log of data blocks of the flexible volume clone that are shared with the snapshot of the base flexible volume that require an update or to be written in accordance with splitting the flexible volume clone from the snapshot of the base flexible volume. In some embodiments, the non-volatile memory to log the data block update requests may comprise contents of the NVRAM log as discussed with relation to FIG. 2.

After receiving a write allocation of a data block that has been marked or indicated as 'fake dirty,' the method 1000 may retain (at step 1030) the virtual volume block number to a newly written or updated data block. For example, the method 1000 may retain a virtual volume block number to a data block of a flexible volume clone that is shared with or backed by a snapshot of a base flexible volume after the data block has been marked as 'fake dirty.' Moreover, the method 1000 may assign (at step 1040) a new physical volume block number to the data block of the flexible volume clone. Thus, the 'fake dirty' marking of a data block retains the virtual volume block number, but assigns a new physical volume block number to the data block during a write allocation. As such, the marking of data blocks of a flexible volume clone as 'fake dirty' may not be sufficient to retain deduplication as a new physical volume block number is assigned to the newly written data block. However, a use of the 'fake dirty' marking of a data block and a change in write allocation logic may retain deduplication in a flexible volume clone after a flexible volume clone split operation, as described in further detail below.

Figure 11:
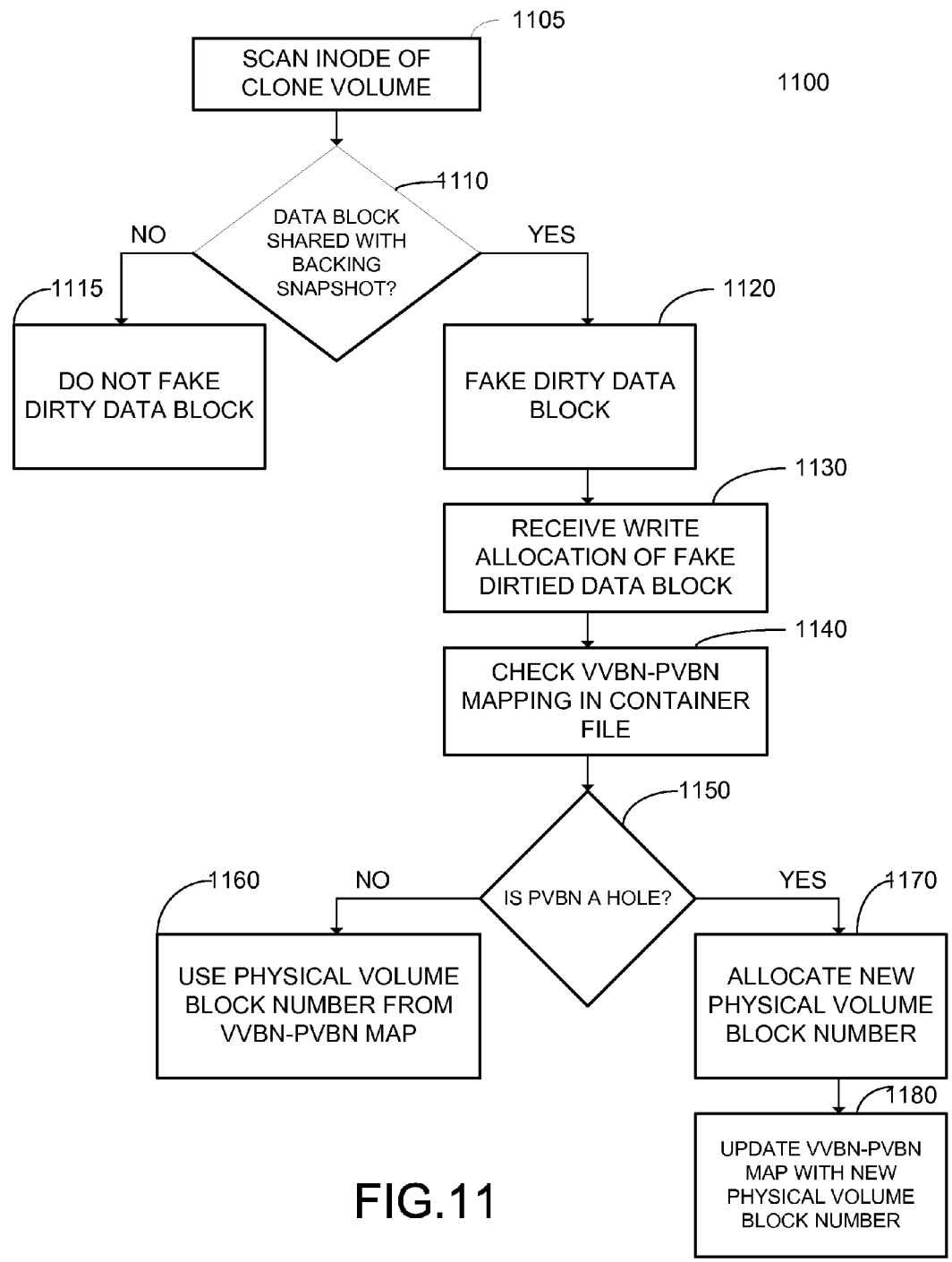
FIG. 11 is a flowchart of a method for marking a data block as fake dirty with a modification to the write allocation logic in accordance with some embodiments.

FIG. 11 is a flowchart of a method 1100 for marking a data block of a flexible volume clone as 'fake dirty' with a change or modification to the write allocation logic when assigning a physical volume block number of the data block of the flexible volume clone. In general, the method 1100 may mark a data block of a flexible volume clone to be split from its base flexible volume as 'fake dirty' if the data block of the flexible volume clone is shared with the snapshot of the base flexible volume. Moreover, the method 1100 may allocate a new physical volume block number to a data block only once for a given virtual volume block number of the flexible volume clone.

As seen in FIG. 11, the method 1100 may scan (at step 1105) an inode of a flexible volume clone. In some embodiments, a flexible volume clone may comprise a plurality of inodes. As such, each inode of a flexible volume clone may be scanned by the method 1100. The method 1100 may determine (at step 1110) whether a particular data block of an inode of a flexible volume clone is shared with a backing snapshot of a base flexible volume. In some embodiments, the determination is performed by accessing and checking a container file associated with the flexible volume clone. The container file may comprise a virtual volume block number to physical volume block number (VVBN-PVBN) map, as previously described. As such, the physical volume block number associated with the virtual volume block number that has been assigned to a data block of the flexible volume block number may either comprise a hole or a '0' value or an address or location. If the physical volume block number from the VVBN-PVBN map is not a '0,' then the data block may not be shared with the snapshot of the base flexible volume (e.g., the data block is associated with the delta data of the flexible volume clone). As such, the method 1100 may not assign or mark (at step 1115) the data block as 'fake dirty.' However, in some embodiments, a data block of a flexible volume clone that is shared with or backed by a snapshot of a base flexible volume may comprise a physical volume block number of a hole or a '0' as indicated in the VVBN-PVBN map. The method 1100 may assign, mark, or indicate (at step 1120) a data block of the flexible volume clone as 'fake dirty' if the physical volume block number associated with the virtual volume block number is a hole or a '0.'

As such, the method 1100 may receive a data block of a flexible volume clone that is to undergo a flexible volume clone split operation. The VVBN-PVBN map of the flexible volume clone is received and referenced to determine whether the data block is shared (e.g., pointing to the same data block of a storage aggregate) with the backing snapshot of the base flexible volume. For example, the virtual volume block number of the received data block may be checked in the VVBN-PVBN map and the corresponding physical volume block number may be analyzed. As such, the VVBN-PVBN map of a flexible volume clone comprises associations between virtual volume block numbers and physical volume block numbers. If the physical volume block number that is associated with the virtual volume block number is not shared with the snapshot of the base flexible volume (e.g., the corresponding physical volume block number is not a '0'), then the data block is not marked or indicated as 'fake dirty.' However, if the physical volume block number that is associated with the virtual block number is shared with the snapshot of the base flexible volume (e.g., the corresponding physical volume block number is a '0'), then the data block is marked or indicated as 'fake dirty.'

The method 1100 may receive (at step 1130) a write allocation of a data block of the flexible volume clone. As previously discussed, the write allocation of the data block may occur during a consistency point. In some embodiments, a plurality of write allocations may be received during a consistency point. As such, a write allocation of a plurality of data blocks of the flexible volume clone may be received. For example, a write allocation of every data block of a flexible volume clone that has been marked as 'fake dirty' may be received. The method 1100 may check or analyze (at step 1140) the VVBN-PVBN map in a container file of the flexible volume clone. In some embodiments, the check or analysis of the VVBN-PVBN map at step 1140 may comprise analyzing the physical volume block number associated with the virtual volume block number of the data block of the flexible volume clone. A determination may be made (at step 1150) whether the physical volume block number associated with the virtual volume block number is a hole or a '0.' If the physical volume block number is not a hole or a '0' as indicated in the VVBN-PVBN map, then it may be assumed that a physical volume block number has already been assigned or allocated to the virtual volume block number that is associated with the data block. Since the write allocation of the data block has been issued for a same virtual volume block number that has already been assigned a physical volume block number, then the physical volume block number associated with the virtual volume block number from the VVBN-PVBN map may be used or assigned (at step 1160) to the data block of the flexible volume clone. As such, a new physical volume block number is not assigned to the data block of the flexible volume clone.

However, if the physical volume block number is a hole or a '0' as indicated in the VVBN-PVBN map, then a new physical volume block number may be assigned or allocated (at step 1170) to the data block of the flexible volume clone. For example, a data block of a flexible volume clone may comprise a virtual volume block number. The method 1100 may analyze the VVBN-PVBN map of the flexible volume clone by looking up the virtual volume block number of the data block and receiving the value of the physical volume block number that is associated with the virtual volume block number. If the physical volume block number is a '0', then a new physical volume block number may be allocated or assigned to the data block. The method may also update (at step 1180) the VVBN-PVBN map with the newly allocated or assigned physical volume block number. For example, the value of the physical volume block number that corresponds to the data block's virtual volume block number may be changed from a hole or a '0' to the newly allocated physical volume block number (e.g., an address or location within the storage aggregate and not a hole or a '0') after allocating the new physical volume block number to the data block.

As a result, the method 1100 may retain deduplication of data blocks of a flexible volume clone during a flexible volume clone split operation. For example, the resulting flexible volume (e.g., after the flexible volume clone has been split from the snapshot of the base flexible volume), may comprise a plurality of data blocks where certain data blocks will comprise the same virtual volume block number and the same physical volume block number. Thus, deduplication is retained through block sharing.

Figure 12A:
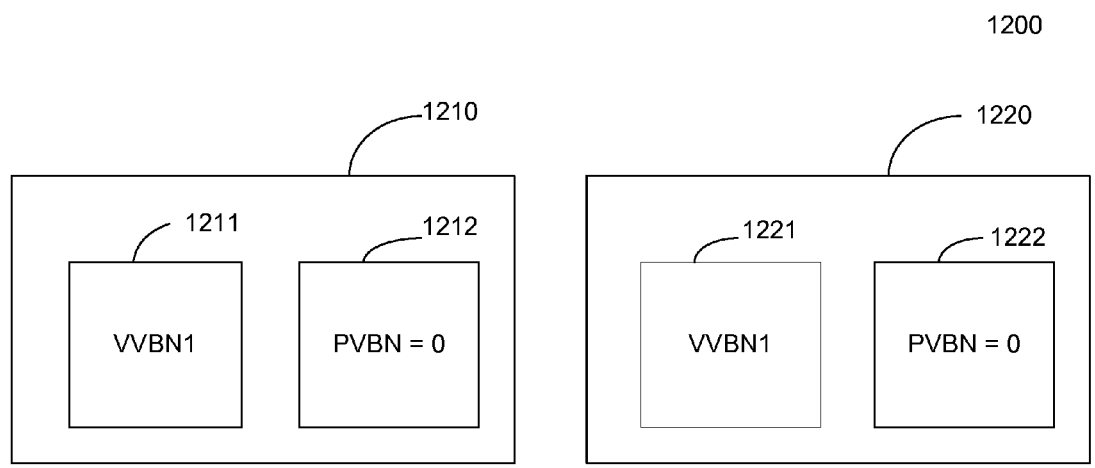
FIG. 12A is an exemplary of a plurality of data blocks of a flexible volume clone that comprises a deduplication of data blocks.

FIG. 12A is an example 1200 of a plurality of data blocks of a flexible volume clone that comprises a deduplication of data blocks. In general, the plurality of data blocks of the flexible volume that are associated with deduplication comprise an identical virtual volume block number and a physical volume block number. As seen in FIG. 12A, each of data block 1210 and data block 1220 comprise a virtual volume block and a physical volume block. Data block 1210 comprises a virtual volume block 1211 and a physical volume block 1212. Similarly, data block 1220 comprises a virtual volume block 1221 and a physical volume block 1222. Since data block 1210 and data block 1220 are deduplicated, the data blocks share a virtual volume block number and a physical volume block number. For example, virtual volume block 1211 and virtual volume block 1221 may comprise an identical value or number 'VVBN1.' Moreover, physical volume block 1212 and physical volume block 1222 may comprise a value of a hole or a '0.' As such, each of the physical volume blocks 1212 and 1222 is shared with a snapshot of a base flexible volume.

Figure 12B:
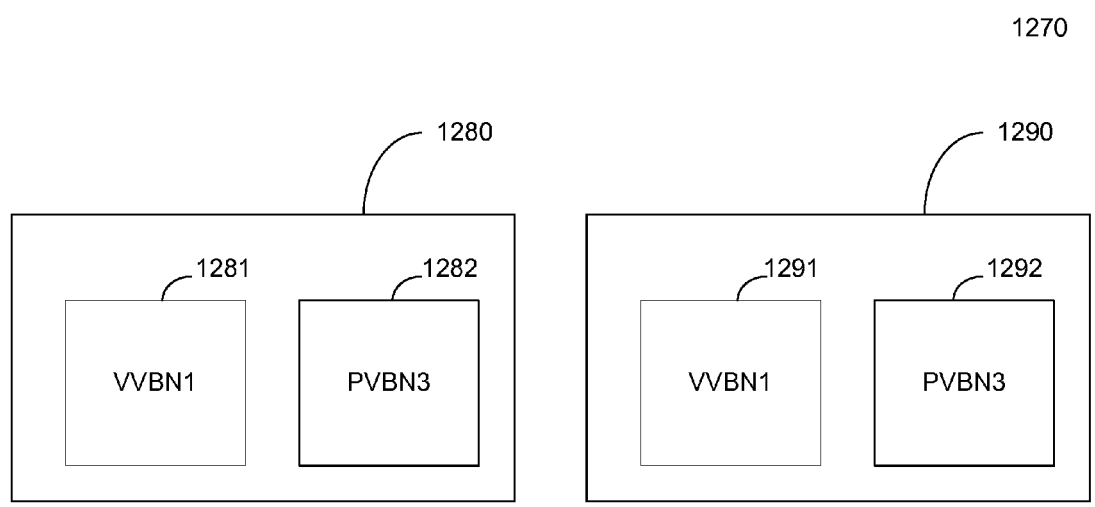
FIG. 12B is an exemplary modified write allocation of deduplicated data blocks of a flexible volume clone that have been marked as 'fake dirty.'

FIG. 12B is an example of a modified write allocation 1240 of deduplicated data blocks of a flexible volume clone that have been marked as 'fake dirty.' In general, the marking of the data blocks as 'fake dirty' with a modified write allocation (as previously described with relation to FIG. 11) results in the retention of the deduplication of shared data blocks of the flexible volume clone. In some embodiments, if the data blocks 1210 and 1220 of FIG. 12A are marked as 'fake dirty' with the modified write allocation as described with relation to FIG. 11, then deduplication may be retained. For example, data block 1280 and data block 1290 may represent data block 1210 and data block 1220 after a modified write allocation and being marked or indicated as 'fake dirty.' As seen in FIG. 12B, the data block 1280 comprises a virtual volume block 1281 and a physical volume block 1282 and the data block 1290 comprises a virtual volume block 1291 and a physical volume block 1292. Each data block 1280 and 1290 comprises an identical virtual volume block number and an identical physical volume block number. For example, the virtual volume block 1281 of data block 1280 and the virtual volume block 1291 of data block 1290 both comprise an identical virtual volume block number of "VBN1." Likewise, the physical volume block 1282 of data block 1280 and the physical volume block 1292 of data block 1290 also comprise an identical physical volume block number of "PVBN3." As such, each data block shares pointers to an identical virtual volume block and an identical physical volume block. Thus, deduplication has been retained.

Figure 13:
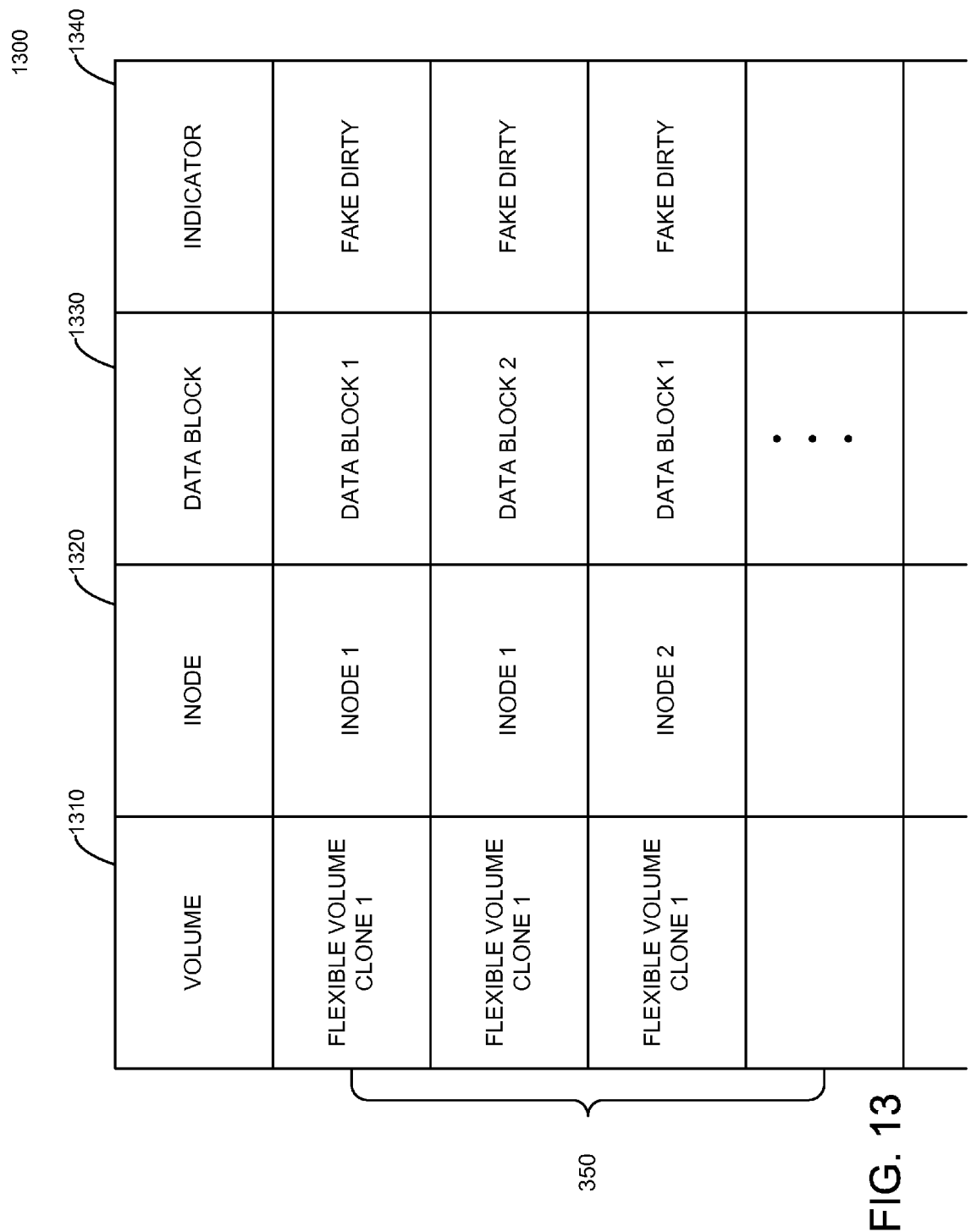
FIG. 13 is an exemplary data clone hierarchy migration management data structure 900 used in some embodiments.

FIG. 13 shows a flexible volume clone data block write allocation data structure 1300 used in some embodiments. In some embodiments, the flexible volume clone data block write allocation data structure 1300 comprises a plurality of dataset entries 1350, each dataset entry 1350 representing a volume identifier, inode identifier, data block identifier, and a write allocation indicator (discussed below). Each dataset entry 1350 may comprise a plurality of data fields for storing data describing or identifying the volumes, inodes, data blocks, and write allocation indicators.

In some embodiments, a flexible volume clone block data write allocation data entry 1350 representing a write allocation for a data block may contain data fields for a volume identifier 1310, inode identifier 1320, data block identifier 1330, and write allocation indicator 1340. The volume identifier 1310 may comprise information identifying a specific flexible volume. For example, the flexible volume identifier 1310 may comprise a name or address of a flexible volume or a flexible volume clone. In some embodiments, the flexible volume identifier may identify a base flexible volume or the flexible volume identifier may provide identity information for a flexible volume clone. As such, the flexible volume identifier 1310 may identify either of a base flexible volume or a flexible volume clone.

The inode identifier 1320 may identify an inode of a volume for each dataset entry 1350. For example, the inode identifier 1320 may identify inodes of a flexible volume clone that is undergoing a volume clone split operation. Data block identifier 1330 may identify data blocks of the inode as identified from the inode identifier 1320. For example, if an inode comprises a plurality of data blocks, then the inode identifier 1320 may identify one such data block associated with the inode.

Write allocation indicator 1340 may indicate a type of write allocation to perform on a data block identified by the data block identifier 1330. For example, the write allocation indicator 1340 may comprise an indicator or marking of 'fake dirty' for a data block identified in the data block identifier 1330.

In some embodiments, the volume identifier field 1310, inode identifier field 1320, data block identifier field 1330, and write allocation indicator field 1340 may be generated or received when a flexible volume clone is to be split from its base flexible volume. For example, the flexible volume clone data block write allocation data structure 1300 may be updated whenever a flexible volume clone is to be split from its base flexible volume.

As such, the flexible volume clone data block write allocation data structure 1300 receives information about volumes, stores the information about the volumes in a data structure, and comprises a write allocation indicator for data blocks of the volume.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system, comprising at least one processor and memory, for managing data on a storage system, the storage system providing data storage for a storage object and a clone of the storage object, the system configured for:
    receiving a write allocation for a data block of the clone, wherein the data block includes a virtual address pointer to a location within an address space of the clone, the clone comprises a plurality of data blocks and is based on the storage object, and the data block comprises a physical address pointer to a location within a storage aggregate;
    determining if the data block is shared with at least one data block of the storage object;
    assigning a new pointer to the physical address pointer if the data block is shared with at least one data block of the storage object; and
    updating, when the new pointer is assigned, a data block map of the clone by changing a physical address pointer in the data block map paired with at least one virtual address pointer corresponding to the virtual address pointer with the new pointer.

2. The system of claim 1, wherein data blocks of the clone comprise virtual address pointers to an address space of the clone.

3. The system of claim 1, wherein the data block is shared with at least one data block of the storage object if the physical address pointer of the data block is the same as at least one physical address pointer of at least one data block of the storage object.

4. The system of claim 1, configured for:
    receiving a second write allocation of another data block of the clone comprising the same virtual address pointer.

5. The system of claim 4, configured for:
    assigning, when the second write allocation has been received, the physical address pointer from the data block map.

6. The system of claim 1, configured for:
receiving a split operation for the clone, wherein the split operation indicates data blocks of the clone that are shared with at least one data block of the storage object, and the indicating of the data blocks results in a second write allocation of the data blocks.

7. The system of claim 1, wherein the storage aggregate comprises an address space over a plurality of storage devices.

8. A method for managing data on a storage system, the storage system providing data storage for a storage object and a clone of the storage object, the method comprising:
receiving a write allocation for a data block of the clone, wherein the data block includes a virtual address pointer to a location within an address space of the clone, the clone comprises a plurality of data blocks and is based on the storage object, and the data block comprises a physical address pointer to a location within a storage aggregate;
determining if the data block is shared with at least one data block of the storage object;
assigning a new pointer to the physical address pointer if the data block is shared with at least one data block of the storage object; and
updating, when the new pointer is assigned, a data block map of the clone by changing a physical address pointer in the data block map paired with at least one virtual address pointer corresponding to the virtual address pointer of the data block with the new pointer.

9. The method of claim 8, wherein data blocks of the clone comprise virtual address pointers to the address space of the clone.

10. The method of claim 8, the assigning a new pointer comprising:
assigning the new pointer if the virtual address pointer is different from virtual address pointers of write allocations for data blocks of the clone received prior to the write allocation.

11. The method of claim 8, comprising:
receiving a second write allocation of another data block of the clone comprising the same virtual address pointer.

12. The method of claim 11, comprising:
assigning, when the second write allocation has been received, the physical address pointer from the data block map.

13. The method of claim 8, comprising:
receiving a split operation for the clone, wherein the split operation indicates data blocks of the clone that are shared with at least one data block of the storage object, and the indicating of the data blocks results in a second write allocation of the data blocks.

14. The method of claim 8, wherein the storage aggregate comprises a second address space over a plurality of storage devices.

15. A non-transitory computer readable medium carrying one or more instructions for managing data on a storage system, the storage system providing data storage for a storage object and a clone of the storage object, wherein the one or more instructions, when executed by one or more processors, cause the one or more processors to perform:
determining if a data block of the clone is shared with at least one data block of the storage object, wherein the data block comprises a physical address pointer to a location within a storage aggregate;
assigning a new pointer to the physical address pointer if the data block is shared with at least one data block of the storage object; and
updating, when the new pointer is assigned, a data block map of the clone by changing a physical address pointer in the data block map with the new pointer.

16. The non-transitory computer readable medium of claim 15, wherein the one or more instructions, when executed by the one or more processors, cause the one or more processors to perform:
receiving a write allocation for the data block.

17. The non-transitory computer readable medium of claim 15, wherein the data block includes a virtual address pointer to a location within an address space of the clone.

18. The non-transitory computer readable medium of claim 15, wherein the clone comprises a plurality of data blocks and is based on the storage object.

19. The non-transitory computer readable medium of claim 15, wherein the physical address pointer, prior to the assigning, is different than the new pointer.

20. The non-transitory computer readable medium of claim 15, wherein the one or more instructions, when executed by the one or more processors, cause the one or more processors to perform:
receiving a split operation for the clone, wherein the split operation indicates data blocks of the clone that are shared with at least one data block of the storage object.

* * * * *